(12) United States Patent
Chinnalagu et al.

(10) Patent No.: US 12,107,813 B2
(45) Date of Patent: Oct. 1, 2024

(54) SYSTEMS AND METHODS FOR UPDATING AND PRESENTING SUBJECT-SPECIFIC COMPLIANCE STANDARD INFORMATION

(71) Applicants: AC Infotech Inc., Santa Clara, CA (US); Matrix Absence Management, Inc., Phoenix, AZ (US)

(72) Inventors: Anandan Chinnalagu, Santa Clara, CA (US); Gordon Smith, Phoenix, AZ (US)

(73) Assignees: AC Infotech Inc., Santa Clara, CA (US); Matrix Absence Management, Inc., Phoenix, AZ (US)

( * ) Notice: Subject to any disclaimer, the term of this patent is extended or adjusted under 35 U.S.C. 154(b) by 0 days.

(21) Appl. No.: 18/320,963

(22) Filed: May 19, 2023

(65) Prior Publication Data
US 2023/0379284 A1  Nov. 23, 2023

Related U.S. Application Data

(63) Continuation-in-part of application No. 18/309,626, filed on Apr. 28, 2023, which is a continuation of (Continued)

(51) Int. Cl.
*H04L 51/216* (2022.01)
*G06F 16/901* (2019.01)
(Continued)

(52) U.S. Cl.
CPC ........ *H04L 51/216* (2022.05); *G06F 16/9024* (2019.01); *G06F 40/205* (2020.01); *G06F 40/40* (2020.01); *G06N 20/00* (2019.01)

(58) Field of Classification Search
CPC ..... H04L 51/02; H04L 51/216; G06Q 10/105; G06Q 10/06398; G06Q 10/063114; (Continued)

(56) References Cited

U.S. PATENT DOCUMENTS 10,496,678 B1  12/2019  Tang
11,256,747 B1  2/2022  Eksombatchai et al.
(Continued)

*Primary Examiner* — Soe Hlaing

(57) ABSTRACT

Systems and methods for updating and presenting subject-specific compliance standard information are provided. Each workforce status tool implements a conditional logic for a corresponding workforce status category. A request to configure a first workforce status tool is received that includes a change of an output or an input dependency of a corresponding conditional logic associated with the first workforce status tool. Responsive to the request, a determination is made to update a node graph including a plurality of interconnected nodes when the change of the corresponding conditional logic satisfies one or more compliance requirements associated with a corresponding benefit. At least one node in the plurality of interconnected nodes is associated with the conditional logic for the corresponding workforce status. Updated compliance information is presented to a user responsive to the change of the corresponding conditional logic and in accordance with a corresponding progression through the plurality of interconnected nodes.

20 Claims, 25 Drawing Sheets

Related U.S. Application Data application No. 17/750,177, filed on May 20, 2022, now Pat. No. 11,677,706.

(51) Int. Cl.
*G06F 40/205* (2020.01)
*G06F 40/40* (2020.01)
*G06N 20/00* (2019.01)

(58) Field of Classification Search
CPC .... G06F 16/9024; G06F 40/205; G06F 40/40; G06N 20/00
See application file for complete search history.

(56) References Cited

U.S. PATENT DOCUMENTS

| | | |
|---|---|---|
| 2017/0180284 A1 | 6/2017 | Smullen et al. |
| 2019/0268288 A1* | 8/2019 | Chandra ................. G06F 9/541 |
| 2019/0361910 A1 | 11/2019 | Rogynskyy et al. |
| 2020/0342414 A1 | 10/2020 | Smith |

* cited by examiner

600

*(602)* A method for updating and presenting subject-specific compliance standard information. At a computer system comprising one or more processors and a memory.

*(604)* Storing, in electronic form, one or more workforce status tools, wherein each workforce status tool in the one or more workforce status tools is configured to implement a conditional logic for a corresponding workforce status category in an enumerated plurality of workforce status categories for a respective employee at a first institution.

*(606)* The one or more workforce status tools comprises an account services tool, a digital security tool, a physical security tool, a facility security tool, an intake tool, a leave status tool, a reporting tool, an administrative tool, a benefits tool, a stock purchase plan tool, a performance review tool, a workload management tool, a demographic tool, a notification tool, a task management tool, a billing tool, a support tool, a training tool, a correspondence tool, a compliance tool, a utility tool, a feedback tool, a medical outreach tool, or a combination thereof.

*(608)* The enumerated plurality of workforce status categories comprises a performance workforce status category, a maternity leave workforce status category, a short-term disability workforce status category, a longer-term disability workforce status category, a sick leave workforce status category, a fostering or adopting workforce status category, an employer program workforce status category, a surrogacy workforce status category, a parental workforce status category, a pre-natal leave workforce status category, a newborn baby bonding leave workforce status category, a caregiver leave workforce status category, a military service leave workforce status category, a paid time off (PTO) leave workforce status category, a vacation workforce status category, or a combination thereof.

*(610)* Receiving a request to configure a first workforce status tool in the one or more workforce status tools in the enumerated plurality of workforce statuses, wherein the request is associated with a first employee of the first institution, and wherein the request to configure the first workforce status tool comprises a change of at least an output dependency or an input dependency of a corresponding conditional logic associated with the first workforce status tool.

*(612)* The first workforce status tool is further configured to implement a data access protocol associated with obtaining personal identifiable information of the user.

*(614)* The first employee is an administrator of the first institution, and wherein the user is an employee of the first institution different than the administrator.

*(616)* The first institution is a federal government institution, a state government institution, a county government institution, a municipal government institution, a private institution, a for-profit institution, a non-profit institution, an insurance institution, or a combination thereof.

*(618)* The request to configure the first workforce status tool is provided, at least in part, from selecting a first menu item by the administrator, selecting a first button by the administrator, providing an input in a text box by the administrator, selecting a check box by the administrator, selecting a first row and/or a first column in a first table by the administrator, performing a custom action by the administrator, moving a position of a slider by the administrator, or a combination thereof.

*(620)* The corresponding conditional logic comprises Boolean logic.

*(622)* The change of the at least the output dependency or the input dependency of the corresponding conditional logic comprises a correlation between a first node and the at least one node in the plurality of interconnected nodes is associated with the conditional logic for the corresponding workforce status category.

*(624)* The change of the at least the output dependency comprises defining at least a total number of days a respective user is entitled to be absent from the first institution within a period of time.

*(626)* The change of the at least the output dependency comprises configuring a visualization of the compliance information presented to the user through the node graph.

*(628)* The visualization of the compliance information comprises one or more charts, one or more graphs, one or more maps, one or more calendars, one or more text boxes, or a combination thereof.

*(630)* Determining, responsive to the request to configure the first workforce status tool, when the change of the at least the output dependency or the input dependency of the corresponding conditional logic associated with the first workforce status tool satisfies one or more compliance requirements associated with a corresponding benefit associated with the first institution.

*(632)* The determining when the change of the at least the output dependency or the input dependency of the corresponding conditional logic satisfies the one or more compliance requirements further comprises authenticating the request to configure the first workforce status tool in accordance with a login operation protocol.

*(634)* Updating, in accordance with a determination the change of the at least the output dependency or the input dependency of the corresponding conditional logic satisfies the one or more compliance requirements, a node graph comprising a plurality of interconnected nodes, wherein at least one node in the plurality of interconnected nodes is associated with the conditional logic for the corresponding workforce status category in the enumerated plurality of workforce status categories.

*(636)* The updating the node graph further comprises storing, in electronic form, within a corresponding data structure of the first workforce status tool, the change of the at least the output dependency or the input dependency of the corresponding conditional logic.

*(638)* The updating the node graph further comprises generating, in electronic form, a corresponding data structure of a second workforce status tool, wherein the second workforce status tool is configured to implement the change of the at least the output dependency or the input dependency of the corresponding conditional logic of the first workforce status tool.

*(640)* Presenting, updated compliance information to a user, using the node graph, responsive to the change of the at least the output dependency or the input dependency of the corresponding conditional logic and in accordance with a corresponding progression of the user through the plurality of interconnected nodes.

*(642)* The presenting comprises utilizing a protocol to present updated compliance information to the user, wherein the protocol is selected from the group consisting of: a voice over Internet Protocol (VoIP), an Internet message access protocol (IMAP), a post office protocol (POP), an extensible messaging and presence protocol (XMPP), a Session Initiation Protocol for Instant Messaging and Presence Leveraging Extensions (SIMPLE), an Instant Messaging and Presence Service (IMPS), and Short Message Service (SMS) protocol.

Figure 6C

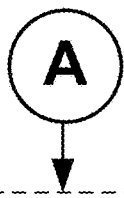

*(644)* Hosting, via a communication network, a communications platform module accessible by the user through a graphical user interface displayed through a display of a client device.

*(646)* The communication network comprises a local area communication network (LAN), a wide area communication network (WAN), a cellular communication network, an intranet communication network, a wireless communication network, a metropolitan area network (MAN), or a combination thereof.

Here's the summary of what we found for you

You can take up to 26 weeks away from work starting 5/19/2023 and returning to work on 11/17/23

You can obtain 100% of pay for the first 11 weeks by using 204 hours of your personal time off
You will be paid at 60% for 7 addition weeks – Do we need to show the dates ?
You will receive no pay for the last 7 weeks -Do we need to show the dates ?

Your job will be protected for 22 weeks of this absence starting on 5/19/23 through 10/19/23

( Note: for our calculation in the tool the date for job protecting ending is the day before they RTW so formula is
RTW date – 1 and also  minus any number of weeks with no job protection

Here's the summary of what we found for you

You can take up to X weeks away from work starting 5/1/2023 and returning to work on 8/30/23

You will be paid at 100% for x of these weeks - Abb
You will be paid at 70% for y of these weeks
You will receive no pay for the last z of these weeks Your job will be protected for x weeks of this absence starting on 5/1/23 through 7/14/23

Next

Please rate your Blueprint experience

★ ★ ★ ★ ★

Enter your feedback here

Please provide any suggestions you have for improvement or questions from the experience Done

Here's the summary of what we found for you

You can take up to W weeks away from work starting 5/1/2023 and returning to work on 8/30/23

You will be paid at 100% for X of these weeks
You will be paid at 70% for Y of these weeks
You will receive no pay for the last Z of these weeks Your job will be protected for V weeks of this absence starting on 5/1/23 through 7/14/23

Next

Client
Total Site visits day, week, month, year
# of partial completions
    What was the last question they completed.
# of partial completions by absence category (Pregnancy, paternal, fostering, bonding
# of partial completions by State # of completions
# of completions by absence category (Pregnancy, paternal, fostering, bonding
# of completions by State # of PDF's generated

Rating by star category – like Amazon showing the number of 1 – 5-star rating
Comments

BOB
Reporting would the rollup of the client level and include industry / SIC / # of lives / # of states for comparison. Utilization may also depend on product mix they have from us.

Figure 15

1800
A
| | Type | Conditional Logic |
|---|---|---|
| 1 | 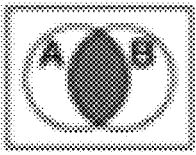 | $C = A \wedge B$ |
| 2 | 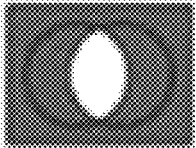 | $C = \sim(A \wedge B)$ |
| 3 | 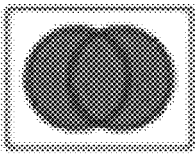 | $C = A \vee B$ |
| 4 | 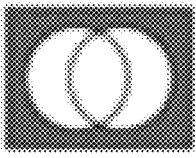 | $C = \sim(A \vee B)$ |
| 5 | 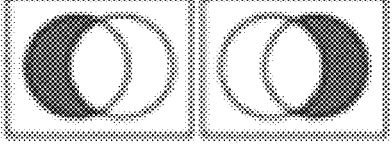 | $C = A \wedge \sim B,\ C = \sim A \wedge B$ |
| 6 | 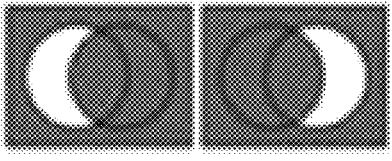 | $C = \sim A \vee B,\ C = A \vee \sim B$ |
| 7 | 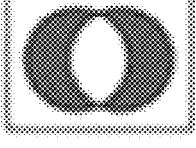 | $C = \sim(A \leftrightarrow B)$ |
| 8 | 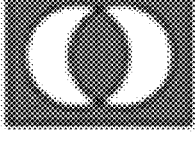 | $C = A \leftrightarrow B$ |
Figure 18

SYSTEMS AND METHODS FOR UPDATING AND PRESENTING SUBJECT-SPECIFIC COMPLIANCE STANDARD INFORMATION

CROSS-REFERENCE TO RELATED PATENT APPLICATIONS

The present Application is a Continuation-in-Part of U.S. patent application Ser. No. 18/309,626, entitled "Systems and Methods for Evaluating and Displaying Subject-Specific Compliance Standard Information," filed Apr. 28, 2023, which is a Continuation of U.S. Pat. No. 17,750,177, entitled "Systems and Methods for Evaluating and Displaying Subject-Specific Compliance Standard Information," filed May 20, 2022, each of which is hereby incorporated by reference in its entirety for all purposes.

TECHNICAL FIELD

The present disclosure is directed to systems and methods for updating and presenting subject-specific compliance standard information.

BACKGROUND

The rights for employees to be absent from work have greatly improved over recent years due to changes in employment policies. These changes in employment policies include improved internal business practices as well as government mandated regulations, such as the Family and Medical Leave Act (FMLA) of 1993, which provides employees with job-protected and unpaid leave for qualified medical and family reasons. While these regulations and policies were created to improve workplace conditions for employees, compliance with these regulations and policies has proven difficult for businesses and organizations. For instance, approximately half the United States workforce is covered by FMLA yet a majority of workers are unable to take advantage of the benefits provided by this regulation due to their employers' non-compliance (Armenia et al., 2014, "Workplace compliance with the law: The case of the family and medical leave act," Work and Occupations, (41.3), pg. 277). One source of non-compliance stems from the difficulty in properly determining the exact limitations and requirements for specific types of leave that are in accordance with both company policies as well as federal, state and local government regulations. This is particularly difficult for small businesses, ill-equipped human resource departments, and individual employees (E. Kelly, 2010, "Failure to update: an institutional perspective on noncompliance with the Family and Medical Leave Act," Law and Society Review, (44.1), pg. 33). Further, human resource departments and other departments that handle such claims are overloaded with such absence claims given in, part, the amount of work that is required to process each absence claim.

Moreover, due to complexities that are directly or indirectly managed by a company, human resource ("HR") management has become a challenge to implement at an employee specific level. For instance, as a company grows, managing employee benefits in an effective and risk-free manner, such as a state leave program, becomes increasingly difficult—particularly when the company grows across multiple jurisdictions. Thus, managing the individualized needs of each employee is challenging in the face of the regulatory rules imposed on the company by government regulation as well as collective bargaining agreements, which often change over time.

One approach to address non-compliance is to create an employee accessible online portal that allows employees to directly initiate absence requests. Once initiated, such requests are reviewed by a supervisor through the portal. While such a portal allows absence request management from a single point of access, it does not adequately address the above-identified problems of complexity and human resource department overload or the human aspects of managing absences. For instance, supervisors must log into the portal and actively seek desired information by navigating through the portal to find a listing of employees absent for a particular period of time. Supervisors quickly become flooded with absence claims and communications that are received from their numerous supervisees over prolonged periods of time, such as individual employees communicating their respective absence claims. Furthermore, if a reporting hierarchy within a company shifts, through the termination or transfer of supervisors, the portal becomes outdated until such reporting structures are manually updated.

Additionally, instances where absentee requests are initiated through a natural language chatbot, the determination of how to properly respond such requests in a personalized manner is challenging, in part, due to the subtleties and ambiguities of natural languages, as well as limitations in accessing sensitive information for the specific issues the employee wishes to resolve within an employee management environment. Accordingly, conventional solutions often fail to satisfactorily analyze and respond to such natural language based absentee requests.

Thus, the difficulty of managing absenteeism within an evolving company, and in coordination with ensuring compliance to company policies and government regulations, particularly at a level of an individual supervisor, presents many challenges for human resource departments.

Given the above background, what is needed in the art are improved systems, methods, and apparatuses for facilitating absentee requests.

SUMMARY

The present disclosure addresses the shortcomings disclosed above by providing systems and methods for updating and presenting subject specific compliance information to a user. More particularly, the systems and methods of the present disclosure provide assistance to an institution, such as a user or an employee associated with the institution, by receiving a request to change a corresponding logical condition associated with a workforce status tool. Each workforce status tool is configured to implement conditional logic for a corresponding workforce status category in an enumerated plurality of workforce status categories. Accordingly, in some such embodiments, the workforce status tool allows the employee to particularly configure the corresponding logical condition for the corresponding workforce status category in an individualized manner, such as in a manner specific to either the user or the institution. A determination is made by, at least in part, a computer system when the change of the corresponding logical condition satisfies one or more compliance requirements associated with a corresponding benefit, which allows the disclosed systems and methods to ensure the change proposed by the employee through the request does not violate eligibility for the corresponding benefit. In some embodiments, a first compliance requirement in the one or more compliance requirements is uniquely associated with the corresponding benefit, whereas a second compliance requirement in the one or more compliance requirements is associated with the corresponding benefit and a second benefit different than the corresponding benefit. A node graph that includes a plurality of interconnected nodes is updated in accordance with a determination that the change satisfies the one or more compliance requirements. Moreover, at least one node in the plurality of interconnected nodes is associated with conditional logic for the corresponding workforce status category of the request, which implements the change request. Accordingly, in some embodiments, updated compliance information is presented to the user responsive to the change request and in accordance with a corresponding progression of the user through the plurality of interconnected nodes. From this, the systems and methods of the present disclosure allow for the convenient updating and/or presentation of subject-specific compliance information related to the request to change the conditional logic.

Another aspect of the present disclosure is directed to providing a method. The method is performed at a server system. The server system includes one or more processors and memory. The method includes storing, in electronic form, one or more workforce status tools. Each workforce status tool in the one or more workforce status tools is configured to implement conditional logic for a corresponding workforce status category in an enumerated plurality of workforce status categories for a respective employee at a first institution. The method further includes receiving a request to configure a first workforce status tool in the one or more workforce status tools in the enumerated plurality of workforce statuses. The request to configure the first workforce status tool is associated with a first employee of the first institution. Moreover, the request to configure the first workforce status tool includes a change of at least an output dependency or an input dependency of corresponding conditional logic associated with the first workforce status tool. Furthermore, the method includes determining, responsive to the request to configure the first workforce status tool, when the change of the at least the output dependency or the input dependency of the corresponding conditional logic associated with the first workforce status tool satisfies one or more compliance requirements associated with a corresponding benefit associated with the first institution. Additionally, the method includes updating, in accordance with a determination the change of the at least the output dependency or the input dependency of the corresponding conditional logic satisfies the one or more compliance requirements, a node graph. The node graph includes a plurality of interconnected nodes. At least one node in the plurality of interconnected nodes is associated with the conditional logic for the corresponding workforce status category in the enumerated plurality of workforce status categories. The method further includes presenting updated compliance information to a user, using the node graph, responsive to the change of the at least the output dependency or the input dependency of the corresponding conditional logic and in accordance with a corresponding progression of the user through the plurality of interconnected nodes.

In some embodiments, the method further includes hosting, via a communication network, a client application accessible by the user through a graphical user interface displayed through a display of a client device.

In some embodiments, the communication network includes a local area communication network (LAN), a wide area communication network (WAN), a cellular communication network, an intranet communication network, a wireless communication network, a metropolitan area network (MAN), or a combination thereof.

In some embodiments, the one or more workforce status tools includes an account services tool, a digital security tool, a physical security tool, a facility security tool, an intake tool, a leave status tool, a reporting tool, an administrative tool, a benefits tool, a stock purchase plan tool, a performance review tool, a workload management tool, a demographic tool, a notification tool, a task management tool, a billing tool, a support tool, a training tool, a correspondence tool, a compliance tool, a utility tool, a feedback tool, a medical outreach tool, or a combination thereof.

In some embodiments, the first workforce status tool is further configured to implement a data access protocol associated with obtaining personal identifiable information of the user.

In some embodiments, the enumerated plurality of workforce status categories includes a performance workforce status category, a maternity leave workforce status category, a short-term disability workforce status category, a longer-term disability workforce status category, a sick leave workforce status category, a fostering or adopting workforce status category, an employer program workforce status category, a surrogacy workforce status category, a parental workforce status category, a pre-natal leave workforce status category, a newborn baby bonding leave workforce status category, a caregiver leave workforce status category, a military service leave workforce status category, a paid time off (PTO) leave workforce status category, a vacation workforce status category, or a combination thereof.

In some embodiments, the first employee is an administrator of the first institution. Moreover, the user is an employee of the first institution different than the administrator.

In some embodiments, the first institution is a federal government institution, a state government institution, a county government institution, a municipal government institution, a private institution, a for-profit institution, a non-profit institution, an insurance institution, or a combination thereof.

In some embodiments, the request to configure the first workforce status tool is provided, at least in part, from selecting a first menu item by the administrator, selecting a first button by the administrator, providing an input in a text box by the administrator, selecting a check box by the administrator, selecting a first row and/or a first column in a first table by the administrator, performing a custom action by the administrator, moving a position of a slider by the administrator, or a combination thereof.

In some embodiments, the corresponding conditional logic includes Boolean logic.

In some embodiments, the change of the at least the output dependency or the input dependency of the corresponding conditional logic includes a correlation between a first node and the at least one node in the plurality of interconnected nodes is associated with the conditional logic for the corresponding workforce status category.

In some embodiments, the change of the at least the output dependency includes defining at least a total number of days a respective user is entitled to be absent from the first institution within a period of time.

In some embodiments, the change of the at least the output dependency includes configuring a visualization of the compliance information presented to the user through the node graph.

In some embodiments, the visualization of the compliance information includes one or more charts, one or more graphs, one or more maps, one or more calendars, one or more text boxes, or a combination thereof.

In some embodiments, the determining when the change of the at least the output dependency or the input dependency of the corresponding conditional logic satisfies the one or more compliance requirements further includes authenticating the request to configure the first workforce status in accordance with a login operation protocol.

In some embodiments, the updating the node graph further includes storing, in electronic form, within a corresponding data structure of the first workforce status tool, the change of the at least the output dependency or the input dependency of the corresponding conditional logic.

In some embodiments, the updating the node graph further includes generating, in electronic form, a corresponding data structure of a second workforce status tool. The second workforce status tool is configured to implement the change of the at least the output dependency or the input dependency of the corresponding conditional logic of the first workforce status tool.

In some embodiments, the presenting the updated compliance information includes utilizing a protocol to present updated compliance information to the user. In some such embodiments, the protocol is selected from the group consisting of: a voice over Internet Protocol (VoIP), an Internet message access protocol (IMAP), a post office protocol (POP), an extensible messaging and presence protocol (XMPP), a Session Initiation Protocol for Instant Messaging and Presence Leveraging Extensions (SIMPLE), an Instant Messaging and Presence Service (IMPS), and Short Message Service (SMS) protocol.

Another aspect of the present disclosure is directed to providing a computer system. The computer system includes one or more processors and a controller. At least one program is non-transiently stored in the controller and executable by the controller. The at least one program causes the controller to perform a method. The method includes storing, in electronic form, one or more workforce status tools. Each workforce status tool in the one or more workforce status tools is configured to implement a conditional logic for a corresponding workforce status category in an enumerated plurality of workforce status categories for a respective employee at a first institution. The method further includes receiving a request to configure a first workforce status tool in the one or more workforce status tools in the enumerated plurality of workforce statuses. The request to configure the first workforce status tool is associated with a first employee of the first institution. Moreover, the request to configure the first workforce status tool includes a change of at least an output dependency or an input dependency of a corresponding conditional logic associated with the first workforce status tool. Furthermore, the method includes determining, responsive to the request to configure the first workforce status tool, when the change of the at least the output dependency or the input dependency of the corresponding conditional logic associated with the first workforce status tool satisfies one or more compliance requirements associated with a corresponding benefit associated with the first institution. Additionally, the method includes updating, in accordance with a determination the change of the at least the output dependency or the input dependency of the corresponding conditional logic satisfies the one or more compliance requirements, a node graph. The node graph includes a plurality of interconnected nodes. At least one node in the plurality of interconnected nodes is associated with the conditional logic for the corresponding workforce status category in the enumerated plurality of workforce status categories. The method further includes presenting updated compliance information to a user, using the node graph, responsive to the change of the at least the output dependency or the input dependency of the corresponding conditional logic and in accordance with a corresponding progression of the user through the plurality of interconnected nodes.

Yet another aspect of the present disclosure is directed to providing a non-transitory computer readable storage medium. The non-transitory computer readable storage medium stores one or more programs that includes the one or more programs further including instructions. When executed by a computer system, the instructions cause the computer system to perform a method. The method includes storing, in electronic form, one or more workforce status tools. Each workforce status tool in the one or more workforce status tools is configured to implement a conditional logic for a corresponding workforce status category in an enumerated plurality of workforce status categories for a respective employee at a first institution. The method further includes receiving a request to configure a first workforce status tool in the one or more workforce status tools in the enumerated plurality of workforce statuses. The request to configure the first workforce status tool is associated with a first employee of the first institution. Moreover, the request to configure the first workforce status tool includes a change of at least an output dependency or an input dependency of a corresponding conditional logic associated with the first workforce status tool. Furthermore, the method includes determining, responsive to the request to configure the first workforce status tool, when the change of the at least the output dependency or the input dependency of the corresponding conditional logic associated with the first workforce status tool satisfies one or more compliance requirements associated with a corresponding benefit associated with the first institution. Additionally, the method includes updating, in accordance with a determination the change of the at least the output dependency or the input dependency of the corresponding conditional logic satisfies the one or more compliance requirements, a node graph. The node graph includes a plurality of interconnected nodes. At least one node in the plurality of interconnected nodes is associated with the conditional logic for the corresponding workforce status category in the enumerated plurality of workforce status categories. The method further includes presenting updated compliance information to a user, using the node graph, responsive to the change of the at least the output dependency or the input dependency of the corresponding conditional logic and in accordance with a corresponding progression of the user through the plurality of interconnected nodes.

BRIEF DESCRIPTION OF THE DRAWINGS

FIGS. 6A, 6B, 6C, and 6D collectively illustrate a method for updating and presenting subject-specific compliance standard information, in which dashed boxes indicated optional features, in accordance with some embodiments of the present disclosure;

FIG. 7 illustrates a user interface of a display of a client device that allows an end-user to review a corresponding report generated for a respective subject, in accordance with an exemplary embodiment of the present disclosure;

FIG. 9 illustrates a user interface of a display of a client device that allows an end-user to review a corresponding report generated for a respective subject, in accordance with an exemplary embodiment of the present disclosure;

FIG. 10 illustrates a user interface of a display of a client device that allows an end-user to review a corresponding report generated for a respective subject, in accordance with an exemplary embodiment of the present disclosure;

FIG. 13 illustrates a user interface of a display of a client device that allows an end-user to review a corresponding report generated for a respective subject, in accordance with an exemplary embodiment of the present disclosure;

FIG. 15 illustrates a user interface of a display of a client device that allows an end-user to review a corresponding report including a first listing and a second listing, in accordance with an exemplary embodiment of the present disclosure.

FIG. 18 illustrates exemplary conditional logic functions that are used implemented in various embodiments of the present disclosure.

Figure 1:
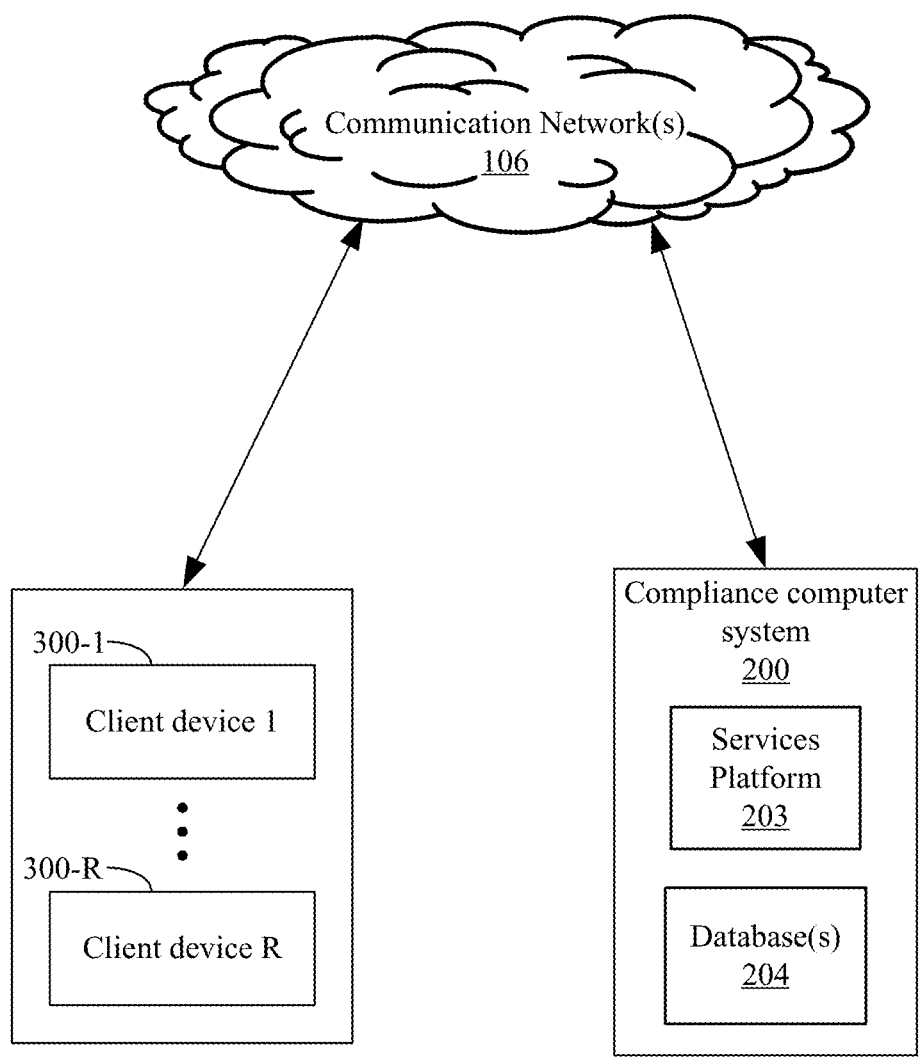
FIG. 1 illustrates a distributed system topology for updating and/or presenting subject-specific compliance standard information including a compliance computer system and a population of client devices, in accordance with an exemplary embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The present disclosure is directed to systems and methods that update and/or display subject-specific compliance standard information, such as information for a compliance standard policy. Each workforce status tool implements a conditional logic for a corresponding workforce status category. A request to configure a first workforce status tool is received that includes a change of an output or an input dependency of a corresponding conditional logic associated with the first workforce status tool. Responsive to the request, a determination is made to update a node graph including a plurality of interconnected nodes when the change of the corresponding conditional logic satisfies one or more compliance requirements associated with a corresponding benefit. At least one node in the plurality of interconnected nodes is associated with the conditional logic for the corresponding workforce status. Updated compliance information is presented to a user responsive to the change of the corresponding conditional logic and in accordance with a corresponding progression through the plurality of interconnected nodes.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, and components have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For instance, a first subject could be termed a second subject, and, similarly, a second subject could be termed a first subject, without departing from the scope of the present disclosure. The first subject and the second subject are both subjects, but they are not the same subject.

The terminology used in the present disclosure is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description includes example systems, methods, techniques, instruction sequences, and computing machine program products that embody illustrative implementations. For purposes of explanation, numerous specific details are set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations. However, the illustrative discussions below are not intended to be exhaustive or to limit the implementations to the precise forms disclosed. Many modifications and variations are possible in view of the above teachings. The implementations are chosen and described in order to best explain the principles and their practical applications, to thereby enable others skilled in the art to best utilize the implementations and various implementations with various modifications as are suited to the particular use contemplated.

In the interest of clarity, not all of the routine features of the implementations described herein are shown and described. It will be appreciated that, in the development of any such actual implementation, numerous implementation-specific decisions are made in order to achieve the designer's specific goals, such as compliance with use case- and business-related constraints, and that these specific goals will vary from one implementation to another and from one designer to another. Moreover, it will be appreciated that such a design effort might be complex and time-consuming, but nevertheless be a routine undertaking of engineering for those of ordering skill in the art having the benefit of the present disclosure.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "about" or "approximately" can mean within an acceptable error range for the particular value as determined by one of ordinary skill in the art, which can depend in part on how the value is measured or determined, e.g., the limitations of the measurement system. For example, "about" can mean within 1 or more than 1 standard deviation, per the practice in the art. "About" can mean a range of ±20%, ±10%, ±5%, or ±1% of a given value. Where particular values are described in the application and claims, unless otherwise stated, the term "about" means within an acceptable error range for the particular value. The term "about" can have the meaning as commonly understood by one of ordinary skill in the art. The term "about" can refer to ±10%. The term "about" can refer to ±5%.

As used herein, a "compliance standard" is a right conferred by an existing law, regulation, or policy to ensure a subject gets a protected right in the form of a corresponding benefit of the compliance standard. In some embodiments, the corresponding benefit is a generic right to leave, a right to reinstatement, a right to pay, a right to continuation of health insurance, a right of job protection, a right against retaliation, or a right against interference. In some embodiments, the right to leave is a right to be absent from work under specific conditions, which are realized as a corresponding plurality of requirements of the compliance standard. Additional details and information regarding a compliance standard and a corresponding benefit of the compliance standard can be found at Williamson, 2019, "The Meaning of Leave: Understanding Workplace Leave Rights," NYUJ Legis. & Pub. Pol'y, 22, pg. 197, which is hereby incorporated by reference in its entirety.

Furthermore, as used herein, the term "dynamically" means an ability to update a program while the program is currently running.

Additionally, the terms "client," "subject," and "user," are used interchangeably herein unless expressly stated otherwise.

As used herein, the term "day," refers to twenty-four hours.

Furthermore, as used herein, the term "week," refers to 168 hours.

Moreover, as used herein, the term "month" refers to 28 days, 29 days, 30 days, or 31 days.

Moreover, as used herein, the term "parameter" refers to any coefficient or, similarly, any value of an internal or external element (e.g., a weight and/or a hyperparameter) in an algorithm, model, regressor, and/or classifier that can affect (e.g., modify, tailor, and/or adjust) one or more inputs, outputs, and/or functions in the algorithm, model, regressor and/or classifier. For example, in some embodiments, a parameter refers to any coefficient, weight, and/or hyperparameter that can be used to control, modify, tailor, and/or adjust the behavior, learning, and/or performance of an algorithm, model, regressor, and/or classifier. In some instances, a parameter is used to increase or decrease the influence of an input (e.g., a feature) to an algorithm, model, regressor, and/or classifier. As a nonlimiting example, in some embodiments, a parameter is used to increase or decrease the influence of a node (e.g., of a neural network), where the node includes one or more activation functions. Assignment of parameters to specific inputs, outputs, and/or functions is not limited to any one paradigm for a given algorithm, model, regressor, and/or classifier but can be used in any suitable algorithm, model, regressor, and/or classifier architecture for a desired performance. In some embodiments, a parameter has a fixed value. In some embodiments, a value of a parameter is manually and/or automatically adjustable. In some embodiments, a value of a parameter is modified by a validation and/or training process for an algorithm, model, regressor, and/or classifier (e.g., by error minimization and/or backpropagation methods). In some embodiments, an algorithm, model, regressor, and/or classifier of the present disclosure includes a plurality of parameters. In some embodiments, the plurality of parameters is n parameters, where: $n \geq 2$; $n \geq 5$; $n \geq 10$; $n \geq 25$; $n \geq 40$; $n \geq 50$; $n \geq 75$; $n \geq 100$; $n \geq 125$; $n \geq 150$; $n \geq 200$; $n \geq 225$; $n \geq 250$; $n \geq 350$; $n \geq 500$; $n \geq 600$; $n \geq 750$; $n \geq 1,000$; $n \geq 2,000$; $n \geq 4,000$; $n \geq 5,000$; $n \geq 7,500$; $n \geq 10,000$; $n \geq 20,000$; $n \geq 40,000$; $n \geq 75,000$; $n \geq 100,000$; $n \geq 200,000$; $n \geq 500,000$, $n \geq 1 \times 10^6$, $n \geq 5 \times 10^6$, or $n \geq 1 \times 10^7$. As such, the algorithms, models, regressors, and/or classifiers of the present disclosure cannot be mentally performed. In some embodiments, n is between 10,000 and $1 \times 10^7$, between 100,000 and $5 \times 10^6$, or between 500,000 and $1 \times 10^6$. In some embodiments, the algorithms, models, regressors, and/or classifier of the present disclosure operate in a k-dimensional space, where k is a positive integer of 5 or greater (e.g., 5, 6, 7, 8, 9, 10, etc.). As such, the algorithms, models, regressors, and/or classifiers of the present disclosure cannot be mentally performed.

Furthermore, when a reference number is given an "$i^{th}$" denotation, the reference number refers to a generic component, set, or embodiment. For instance, a client device termed "client device i" refers to the $i^{th}$ client device in a plurality of client devices (e.g., a client device 300-$i$ in a plurality of client devices 300).

In the present disclosure, unless expressly stated otherwise, descriptions of devices and systems will include implementations of one or more computers. For instance, and for purposes of illustration in FIG. 1, a compliance computer system 200 is represented as single device that includes all the functionality of the compliance computer system 200. However, the present disclosure is not limited thereto. For instance, in some embodiments, the functionality of the compliance computer system 200 is spread across any number of networked computers and/or reside on each of several networked computers and/or by hosted on one or more virtual machines and/or containers at a remote location accessible across a communication network (e.g., communication network 106 of FIG. 1). One of skill in the art will appreciate that a wide array of different computer topologies is possible for the compliance computer system 200, and other devices and systems of the preset disclosure, and that all such topologies are within the scope of the present disclosure. Moreover, rather than relying on a physical communication network 106, the illustrated devices and systems may wirelessly transmit information between each other. As such, the exemplary topology shown in FIG. 1 merely serves to describe the features of an embodiment of the present disclosure in a manner that will be readily understood to one of skill in the art.

FIG. 1 illustrates an exemplary topography of an integrated system 100 for providing an update, such as an update to a first workforce status tool, and/or displaying subject-specific information for a respective subject based on an evaluation of the respective subject using the updated first workforce status tool. However, the present disclosure is not limited thereto. The integrated system 100 includes a compliance computer system 200 that receives a communication for analysis, and one or more client devices 300 (e.g., computing devices) that provide and/or receive communications to and/or from the compliance computer system 200. In some embodiments, each client device 300 is associated with at least one subject (e.g., a first client device 300-1 is associated with a first subject, a second client device 300-2 is associated with a second subject, etc.). However, the present disclosure is not limited thereto.

A detailed description of a system 100 for providing an update, such as an update to a first workforce status tool, and/or displaying subject-specific information for a respective subject based on an evaluation of the respective subject using the updated first workforce status tool in accordance with the present disclosure is described in conjunction with FIG. 1 through FIG. 4. As such, FIG. 1 through FIG. 4 collectively illustrate an exemplary topology of the system 100 in accordance with the present disclosure. In the topology, there is a compliance computer system 200 (e.g., compliance computer system 200 of FIGS. 4A and 4B) that provides services to a plurality of subjects through a communications platform module (e.g., communications platform module 214 of FIG. 3B), and a population of client devices 300 (e.g., client device 300 of FIG. 4) associated with the plurality of subjects that interact with the compliance computer system 200.

Referring to FIG. 1, the distributed computing system 100 include the compliance computer system 200 that is configured to evaluate an update to a respective workforce status tool received through a request by a respective subject associated with a corresponding client device 300 and/or facilitate presenting, or displaying, subject-specific compliance standard information for review by the respective subject (e.g., block 640 of FIG. 6C) or a different subject other than the respective subject. Accordingly, in some embodiments, the distributed computing system 100 includes compliance computer system 200 that is associated with one or more institutions (e.g., first institution 354-1, . . . , institution Z 354-Z of FIG. 3C). The compliance computer system 200 that is configured to facilitate management of one or more absentees for various institutions associated with the distributed computing system (e.g., one or more organizations, one or more humans, one or more companies, etc.), such as by providing absence claim compliance and status notifications of absenteeism. However, the present disclosure is not limited thereto. In some embodiments, the compliance computer system 200 provides one or more absentee services (e.g., via services platform component 203), such as an absentee calendar visualized through a report communicated to a client device 300. In some embodiments, the compliance computer system 200 includes one or more databases 204, such as an employee database, an absentee database, a compliance standard database, or a combination thereof. In some embodiments, one or more of the database(s) 204 is maintained by a different institution than an institution that provides the services platform component 203. In some embodiments, a first institution provides and maintains the services platform component 203 for assisting subjects with managing absentee data that is stored in the database(s) 204, which are maintained by a second institution and communicatively linked to the services platform component 203. However, the present disclosure is not limited thereto.

Of course, other topologies of the distributed computing system 100 other than the one depicted in FIG. 1 are possible. For instance, in some embodiments, rather than relying on a communication network 106, the one or more client devices 300 wirelessly transmit information (e.g., one or more messages, one or more requests of block 610 of FIG. 6A, etc.) directly to the compliance computer system 200. Further, in some embodiments, the compliance computer system 200 and/or the client device 300 constitute a portable electronic device, a server computer, or in fact constitute several computers that are linked together in a network, or is a virtual machine and/or a container in a cloud-computing context. As such, the exemplary topology shown in FIG. 1 merely serves to describe the features of an embodiment of the present disclosure in a manner that will be readily understood to one of skill in the art.

Figure 2:
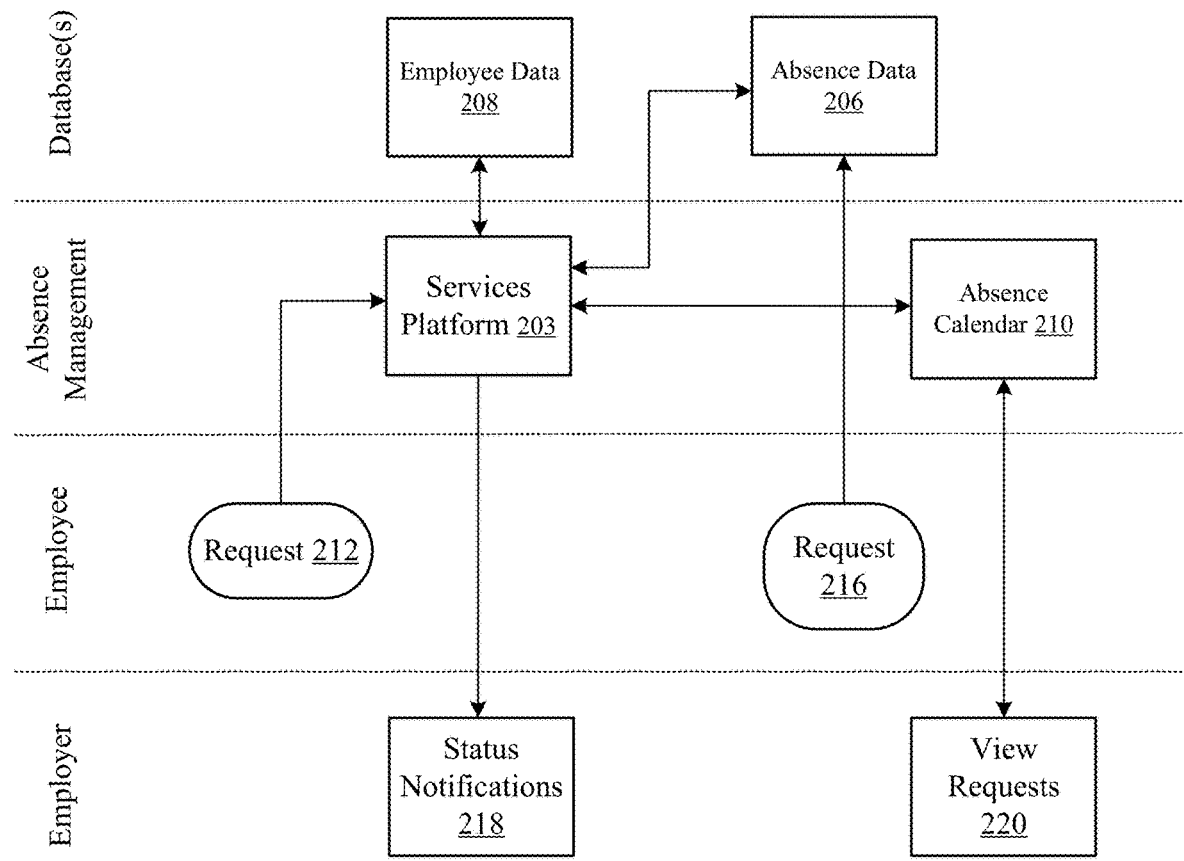
FIG. 2 illustrates a chart depicting an absentee management workflow, in accordance with an exemplary embodiment of the present disclosure.

FIG. 2 illustrates a chart depicting an absentee management workflow, in accordance with some embodiments of the present disclosure. As shown in FIG. 2, in some embodiments, an employee submits a request 212 to the services platform component 203, such as by communicating a request through a communication network 106 (e.g., communication network 106 of FIG. 1). In some embodiments, the employee submits a request to configure, or update, a respective workforce status tool in an enumerated plurality of workforce status tools. In some embodiments, the services platform component 203 is configured to assist the employee with generating the request 212, e.g., by providing form(s), input field(s), instruction(s), and/or information via a human interface module (e.g., a chatbot). However, the present disclosure is not limited thereto. In some embodiments, the services platform component 203 obtains data from one or more databases (e.g., in real time) in response to the request 212, such as employee data 208 and/or absence data 206 (e.g., benefits data module 320 of FIG. 3A, server data modules 350 of FIG. 3C, etc.). In some embodiments, the services platform component 203 is configured to use data from the request 212 (e.g., an employee name and/or identifier of a first workforce status tool 348-1 of FIG. 3A) to query the one or more databases 204 and/or update one or more data items in the one or more databases 204. In some embodiments, the services platform component 203 supplements data from the request 212 with additional compliance data from the employee data 208. In some embodiments, the services platform component 203 obtains (e.g., pulls) the employee data 204 (e.g., in real-time) from the database(s) 204 in response to receiving the request 212, such as one or more compliance requirements (e.g., compliance requirements 326 of FIG. 3A and/or requirements 326 of FIG. 3B). In some embodiments, the services platform component 203 determines a workforce status category associated with the request 212 based on information from the request 212 and/or the employee data 204 associated with the request 212. However, the present disclosure is not limited thereto. In some embodiments, the services platform component 203 updates a workforce status tool 348 based on the request 212 and the employee data 204, and sends the updated workforce status tool 348 to one or more database(s) for storage (e.g., as a second workforce status tool 348-2). However, the present disclosure is not limited thereto.

In some embodiments, the services platform component 203 generates one or more status notifications 218 associated with compliance information based on the request 212, the employee data, and/or the absence data 206, and provides the status notifications 218 to a subject, such as an employee and/or administrator (e.g., a supervisor, manager, a human resources representative, or a combination thereof) of a respective institution. In some embodiments, the services platform component 203 generates the status notification(s) 218 in response to receiving the request 212 (e.g., to obtain approval for the request). In some embodiments, the services platform component 203 generates the status notification(s) 218 in response to an update to the employee data 204, the absence data 206, or a node graph (e.g., first node graph 334-1 of FIG. 3B). In some embodiments, the services platform component 203 generates the status notification(s) 218 on a periodic basis (e.g., a daily basis, a weekly basis, or a monthly basis, etc.) or on a non-periodic basis.

In some embodiments, a respective employee submits a request to change configure a first workforce status tool 348 in the one or more workforce status tools in the enumerated plurality of workforce statuses to the services platform component 203. For instance, in some such embodiments, the employee communicates a request to configure the first workforce status tool that includes a change of at least an output dependency or an input dependency of a corresponding conditional logic when changing or cancel a planned absence. In some embodiments, the services platform component 203 obtains at least a portion of the employee data 204 in response to the request 212. In some embodiments, the services platform component 203 obtains a corresponding workforce status tool 348 in response to the request 212. In some embodiments, the services platform component 203 updates, deletes, overwrites, or a combination thereof the corresponding workforce status tool 348 in response to the request 212. In some embodiments, the services platform component 203 sends an updated workforce status tool 348 to the one or more database(s) (e.g., to be stored as a portion of the workforce status tool module).

In some embodiments, the services platform component 203 presents updated compliance information, such as by generating one or more absentee calendars through a report visualized at a client device 300. In some embodiments, the absentee calendar is generated in response to a request from the institution and/or a request from the first employee.

Figure 3A:
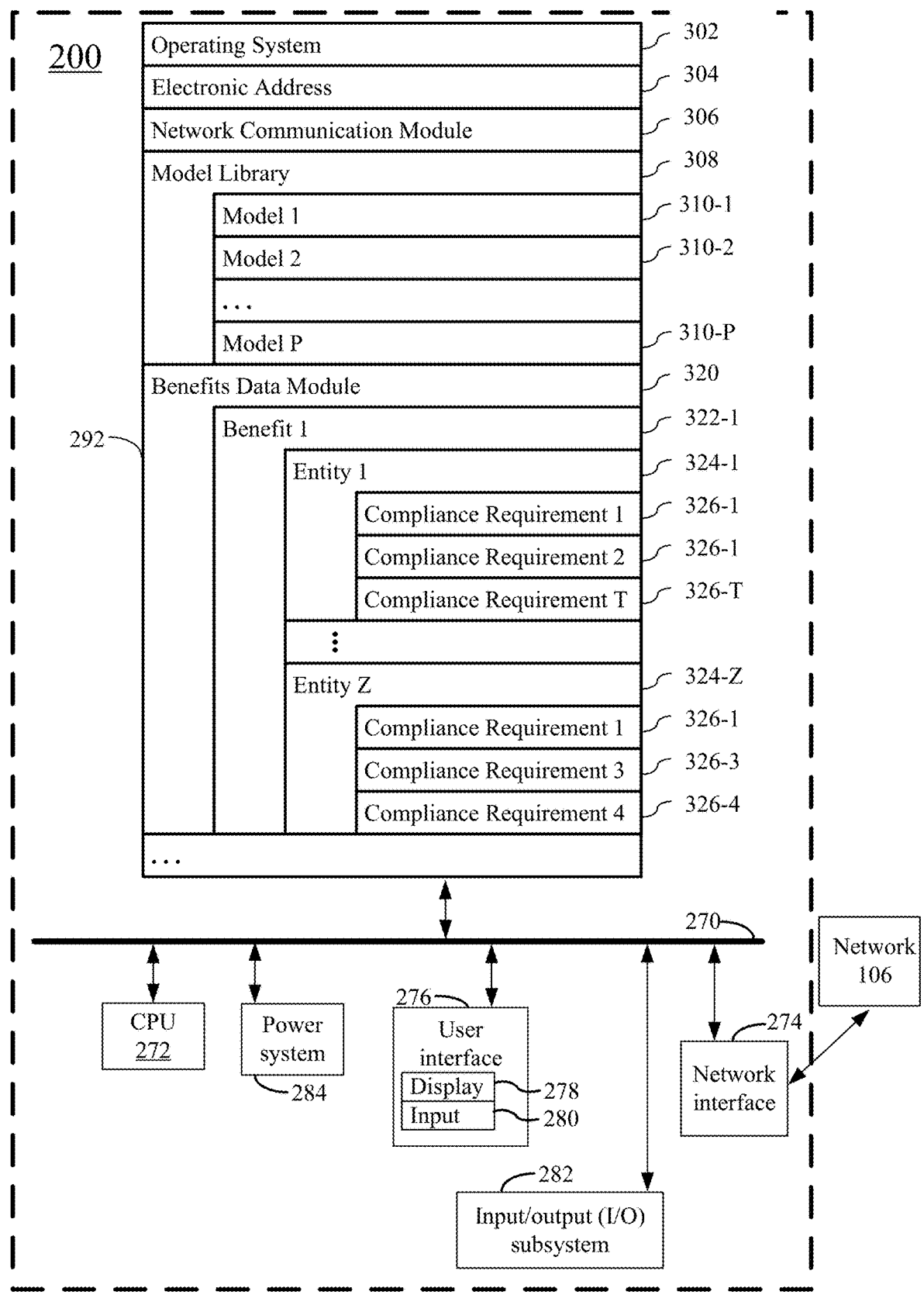
FIGS. 3A, 3B, and 3C collectively illustrate a compliance computer system, in accordance with an exemplary embodiment of the present disclosure.
Figure 3B:
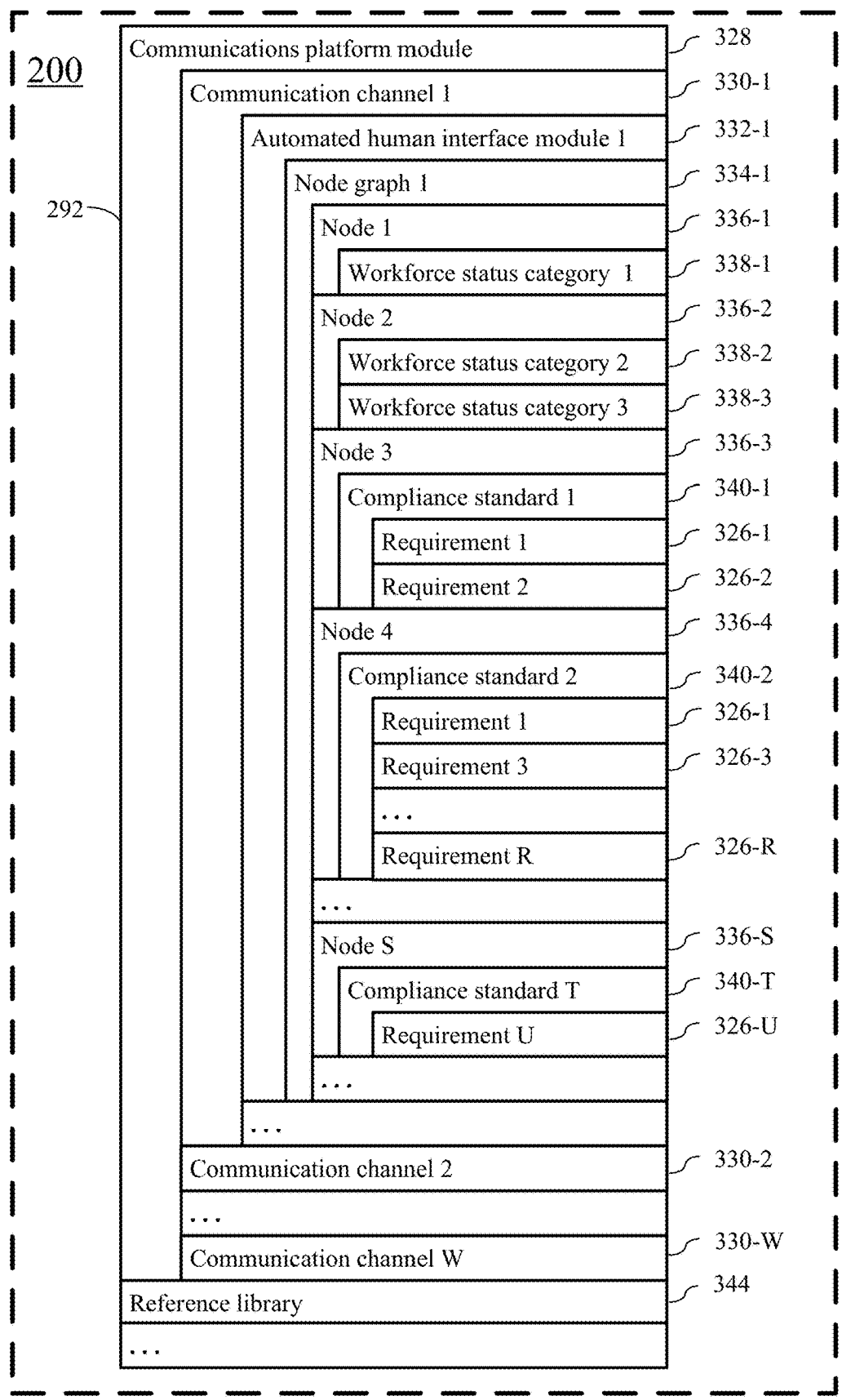
Figure 3C:
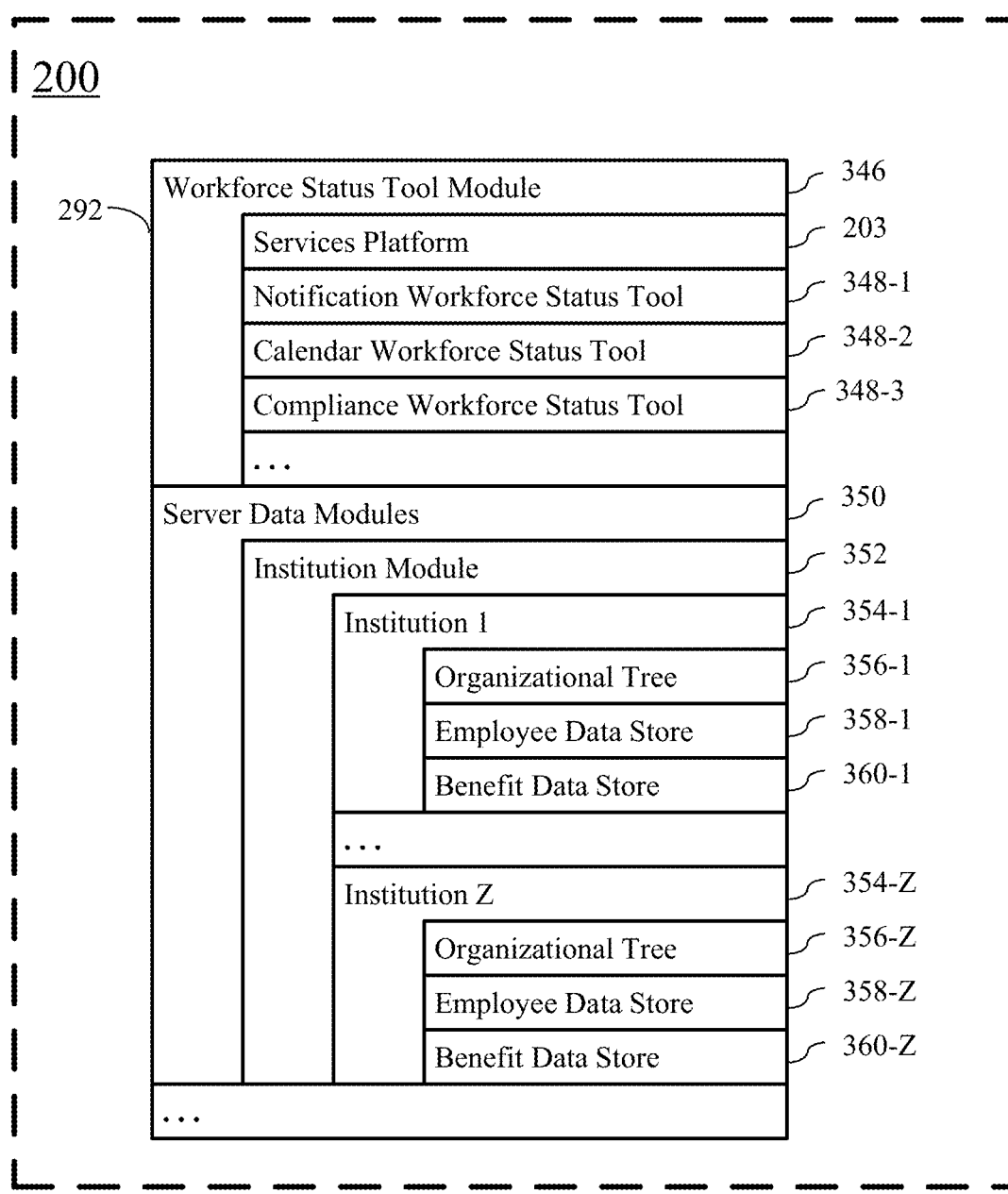

Turning to FIGS. 3A, 3B, and 3C with the foregoing in mind, in some embodiments the compliance computer system 200 includes one or more computers. For purposes of illustration in FIGS. 3A, 3B, and 3C, the compliance computer system 200 is represented as a single computer that includes all of the functionality for providing a characteristic analysis system. However, the present disclosure is not limited thereto. In some embodiments, the functionality for providing a compliance computer system 200 is spread across any number of networked computers, and/or resides on each of several networked computers, and/or is hosted on one or more virtual machines and/or one or more containers at a remote location accessible across the communication network 106. One of skill in the art will appreciate that any of a wide array of different computer topologies are used for the application and all such topologies are within the scope of the present disclosure.

In some embodiments, the compliance computer system 200 receives a message utilizing the communication network 106 wirelessly through radio-frequency (RF) signals. In some embodiments, such signals are in accordance with an 802.11 (Wi-Fi), Bluetooth, or ZigBee standard.

In some embodiments, the compliance computer system 200 receives a request 212 (e.g., request of block 610 of FIG. 6A) directly from a source (e.g., directly from a client device 300 associated with a respective subject that provided the context of the request). In some embodiments, the compliance computer system 200 receives the request from an auxiliary server (e.g., from a remote application host server). In such embodiments, the auxiliary server is in communication with the client device 300 and receives one or more message from the client device 300. Accordingly, the auxiliary server provides the message to the compliance computer system 200. In some embodiments, the auxiliary server provides (e.g., polls for) one or more messages on a recurring basis (e.g., each minute, each hour, each day, or a non-period basis as specified by the auxiliary server and/or a subject, etc.).

In some embodiments, the compliance computer system 200 is not proximate to the subject and/or does not have wireless capabilities or such wireless capabilities are not used for the purpose of obtaining a request and/or hosting a client application. In such embodiments, a communication network 106 is utilized to communicate compliance information (e.g., block 640 of FIG. 6C) to a respective source (e.g., client device 300).

In some embodiments, the communication network(s) 106 interconnects the compliance computer system 200 and the various institutions 354 including their corresponding devices with one another, as well as optional external systems and devices. In some embodiments, the communication network(s) 110 include the Internet, one or more local area networks (LANs), one or more wide area networks (WANs), other types of networks, or a combination of such networks. Examples of communication networks 106 include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of the present disclosure.

The compliance computer system 200 includes one or more processing units (CPU's) 272, a network or other communications interface 274, a memory 292 (e.g., random access memory), one or more magnetic disk storage and or persistent devices optionally accessed by one or more controllers, one or more communication busses 270 for interconnecting the aforementioned components, a user interface 276, the user interface 276 including a display 278 and input 280 (e.g., keyboard, keypad, touch screen), and a power system 240 (e.g., power supply) for powering the aforementioned components. In some embodiments, data in memory 292 is seamlessly shared with non-volatile memory using known computing techniques such as caching. In some embodiments, memory 292 includes mass storage that is remotely located with respect to the central processing unit(s) 272. In other words, some data stored in memory 292 may in fact be hosted on computers that are external to the compliance computer system 200 but that can be electronically accessed by the compliance computer system 200 over an Internet, intranet, or other form of network or electronic cable (illustrated as element 106 in FIG. 2) using network interface 274.

In some embodiments, the memory 292 of the compliance computer system 200 stores:
- an operating system 302 (e.g., ANDROID, iOS, DARWIN, RTXC, LINUX, UNIX, OS X, WINDOWS, or an embedded operating system such as VxWorks) that includes procedures for handling various basic system services;
- an electronic address 304 associated with the compliance computer system 200 that identifies the compliance computer system 200 (e.g., within the communication network 106);
- a network communication module 306 for connecting the compliance computer system 200 to other computing devices (e.g., the client devices 300 associated with a respective institution) via the network interface 274 (e.g., wired or wireless) connected to the one or more communication network(s) 106;
- a model library 308 that stores one or more models 310, such as for evaluating a request provided by a respective subject and/or presenting a corresponding report for the respective subject that includes compliance information;
- a communications platform module 328 for supporting secure communication channels 330 between an automated human interface module 332 of the compliance computer system 200 and a respective subject associated with a client device 300, such as one or more communications associated with a request to change a workforce status tool (e.g., first workforce status tool 348 of FIG. 3B);
- a reference library 344 that stores information obtained from one or more remote sources;
- a workforce status tool module 346 for providing various services and functions to users and client devices 300, including the services platform component 203 that facilitates management of absentee information and requests, a notification module 316 that facilitates generating one or more notifications to provide to the institutions 354 and/or devices of the respective entities, a calendar module 318 that facilitates generating one or more calendars to provide to the institutions or client devices 300 of the respective institutions 354, and a compliance module 319 that facilitates determining compliance with one or more polices and/or compliance standards; and
- one or more server data module(s) 350 for handling the storage of and/or access to employee and/or absence data, including an institution data store 352 that stores data and information related to one or more institutions 354 (e.g., first institution 354-1 of FIG. 3C), in which each institution 354 has associated data and information that includes an organizational tree 356 that represents a hierarchy of the corresponding institution 354, an employee data store 358 that stores data and information related to each employee (e.g., the employee data 204 of FIG. 2) associated with the corresponding institution 354, and an absence data store that stores data and information related to leaves of absence, absence requests, and/or absence types (e.g., absence data 206 of FIG. 2) associated with the corresponding institution 354.

As illustrated in FIG. 3A, the compliance computer system 200 preferably includes an operating system 302 that includes procedures for handling various basic system services. The operating system 302 includes various software components and or drivers for controlling and managing general system tasks (e.g., memory management, storage device control, power management, etc.) and facilitates communication between various hardware and software components.

An electronic address 304 is associated with the compliance computer system 200, which is utilized to at least uniquely identify the compliance computer system 200 from other devices and components of the system 100. In some embodiments, the compliance computer system 200 includes a serial number, and optionally, a model number or manufacturer information that further identifies the compliance computer system 200. In some embodiments, the electronic address 304 associated with the compliance computer system 200 is used to provide a source of a message received from and/or provided to the compliance computer system 200.

In some embodiments, the compliance computer system 200 includes a model library 308 that stores a plurality of models 310 (e.g., classifiers, regressors, clustering, etc.). In some embodiments, the model library 308 stores two more models 310 (e.g., a first model 310-1 and a second model 310-2), three or more models (e.g., the first model 310-1, a second model 310-2, a third model 310-3), four or more models 310, ten or more models 310, 50 or more models 310, or 100 or more models 310.

In some embodiments, a model 310 in the plurality of models 310 is implemented as an artificial intelligence engine for the subject question and answering system (QAS). For instance, in some embodiments, the model 310 includes one or more gradient boosting models 310, one or more random forest models 310, one or more neural network (NN) models 310, one or more regression models, one or more Naïve Bayes models 310, one or more machine learning algorithms (MLA) 310, or a combination thereof. In some embodiments, an MLA or a NN is trained from a training data set that includes one or more features identified from a data set. MLAs include supervised algorithms (such as algorithms where the features/classifications in the data set are annotated) using linear regression, logistic regression, decision trees, classification and regression trees, Naïve Bayes, nearest neighbor clustering; unsupervised algorithms (such as algorithms where no features/classification in the data set are annotated a priori), such as means clustering, principal component analysis, random forest, adaptive boosting; and semi-supervised algorithms (such as algorithms where an incomplete number of features/classifications in the data set are annotated) using generative approach (such as a mixture of Gaussian distributions, mixture of multinomial distributions, hidden Markov models), low density separation, graph-based approaches (such as minimum cut, harmonic function, manifold regularization, etc.), heuristic approaches, or support vector machines.

In some embodiments, a model 310 is in the form of a hybrid deep learning (DL) model such as a Long Short Term Memory (LSTM) model, or a bidirectional LSTM (BiLSTM) model with an attention layer based on a neural network (NN). In some embodiments a model 310 is a deep learning model in the context of a network topology and word embedding technique customized for QAS. In some embodiments, a model 310 is a conditional random fields model 310, a convolutional neural network (CNN) model 310, an attention based neural network model 310, a deep learning model 310, a long short term memory network model 310, or another form of neural network model 310.

While MLA and neural networks identify distinct approaches to machine learning, the terms may be used interchangeably herein. Thus, a reference to MLA may include a corresponding NN or a reference to NN may include a corresponding MLA unless explicitly stated otherwise. In some embodiments, the training of a respective model 310 includes providing one or more optimized datasets, labeling these features as they occur (e.g., in benefits data modules 320 of FIG. 3A, etc.), and training the MLA to predict or classify based on new inputs. Artificial NNs are efficient computing models which have shown their strengths in solving hard problems in artificial intelligence. For instance, artificial NNs have also been shown to be universal approximators, that is, they can represent a wide variety of functions when given appropriate parameters.

One of skill in the art will readily appreciate other models 310 that are applicable to the systems and methods of the present disclosure. In some embodiments, the systems and methods of the present disclosure utilize more than one model 310 to provide determination when a change of a corresponding conditional logic associated with a first workforce status tool 348-1 satisfies one or more compliance requirements 326 associated with a corresponding benefit 322, such as an identity of one or more nodes (e.g., nodes 366 of FIG. 3B) within a node graph (e.g., first node graph 336-1 of FIG. 3B) to progress a respective subject to other nodes 336 in the node graph 334. For instance, in some embodiments, each respective model 310 arrives at a corresponding determined when provided a respective data set associated with a request 212 by the respective subject. Accordingly, in some embodiments, each respective model 310 independently arrives at a result and then the result of each respective model 310 is collectively verified through a comparison or amalgamation of the models 310. From this, a cumulative result is provided by the models 310, either through a voting scheme across several models 310 or by virtue of the models arranged as an ensemble model 310. However, the present disclosure is not limited thereto.

In some embodiments, a respective model 310 is tasked with performing a corresponding activity, such as a step or process of a method (e.g., method 600 of FIGS. 6A through 6D) of the present disclosure. As a non-limiting example, in some embodiments, the task performed by the respective model 310 includes, but is not limited to, storing one or more workforce status tools (e.g., block 604 of FIG. 6A), defining a number of days a respective user is entitled to be absent from a corresponding institution (e.g., block 624 of FIG. 6B), configuring a visualizing of compliance information (e.g., block 626 of FIG. 6B), determining when a change of at least an output dependency or an input dependency of a corresponding logical condition associated with a first workforce status tool 348-1 satisfies one or more compliance requirements (e.g., block 630 of FIG. 6B), authenticating a request to configure the first workforce status tool 348-1 (e.g., block 632 of FIG. 6C), updating a node graph (e.g., block 634 of FIG. 6C), hosting a communications platform (e.g., block 644 of FIG. 6D), or a combination thereof.

In some embodiments, each respective model 310 of the present disclosure makes use of 310 or more parameters, 100 or more parameters, 1,000 or more parameters, 10,000 or more parameters, or 100,000 or more parameters. In some embodiments, each parameter is a conditional logic of the respective model 310. In some embodiments, each respective model 310 of the present disclosure cannot be mentally performed.

In some embodiments, each model 3108 includes a plurality of heuristic instructions that describe various processes for the model 310 to follow when evaluating a request 212, such as determining when the change of the at least the output dependency or the input dependency of the corresponding logical condition associated with the first workforce status tool 348-1 satisfies one or more compliance requirements 326 associated with a corresponding benefit 322 associated with the first institution 354-1. For instance, in some embodiments, a pattern matching model 310 includes a plurality of heuristic instructions that dictate how to evaluate a text object of the request 212 into one or more text strings in accordance with a parts-of-speech analysis. This parts-of-speech analysis is provided by the plurality of heuristic instructions in some embodiments, for instance by identifying a type of clause within a text object and/or text string (e.g., identifying an independent clause and/or a dependent clause within the text object of the message). In some embodiments, one or more models 310 share one or more instructions in a plurality of heuristic instructions.

In some embodiments, the compliance computer system 200 includes a communications platform module 328 for supporting secure communications (e.g., bidirectional conversations) between the compliance computer system 200 and one or more client devices 300. The communications platform module 328 includes a plurality of communication channels 330 (e.g., first communication channel 330-1, second communication channel 330-2, . . . , communication channel W 330-W of FIG. 3B). In some embodiments, each respective subject associated with a client device 300 participates in a conversation in a respective communication channel 330. Each respective communication channel 330 includes an automated human interface module 332 (e.g., first communication channel 330-1 includes first automated human interface module 332-1, second communication channel 330-2 includes second automated human interface module 332-2, etc.) that provides capability for the compliance computer system 200 to automatically engage the respective subject in the conversation. In some embodiments, the automated human interface module 332 initiates a response to an initial request received from the respective subject based on conditional logic made available to the automated human interface module 332 (e.g., block 610 of FIG. 6A, block 630 of FIG. 6B, block 634 of FIG. 6C, block 640 of FIG. 6C, block 644 of FIG. 6D, etc.). For instance, in some embodiments, a response in a message from the respective subject triggers the automated human interface module 332 to progress the respective subject through the available conditional logic, which is, at least in part, in the form of a node graph (e.g., first node graph 334-1 of FIG. 3B, block 634 of FIG. 6C, etc.).

In some embodiments, the compliance computer system 200 include a reference library 344 that uses one or more databases or other form of information to obtain such information (e.g., compliance information) to provide to subjects, such as one or more government regulations associated with a respective compliance standard 340. For instance, if a respective institution that employs a respective subject has an internal policy that must be adhered to, this policy is incorporated within the reference library 344. Similarly, in some embodiments, local and/or regional laws and guidelines are stored in the reference library 344. To this point, in some embodiments, reference library 344 includes, and optionally updates on a recurring basis, guidelines for managing employees with disabilities or workplace restrictions, such as the Americans with Disabilities Act "Americans with Disabilities Act Title II Regulations—Nondiscrimination on the Basis of Disability in State and Local Government Services," 28 Code of Federal Regulations Part 35, as well as the Americans with Disabilities Act "Americans with Disabilities Act Title III Regulations—Nondiscrimination on the Basis of Disability by Public Accommodations and in Commercial Facilities," 28 Code of Federal Regulations Part 36, each of which is hereby incorporated by reference in its entirety. Moreover, in some embodiments, the reference library 230, and optionally updates thereof obtained on a recurring basis, includes guidelines for family and medical leave, such as the Wage and Hour Division of the United States Department of Labor, "The Employer's Guide to the Family and Medical Leave Act," WH 1421, print, which is hereby incorporated by reference in its entirety. However, the present disclosure is not limited thereto. Accordingly, the reference library 344 allows for the compliance computer system 200 to adhere to local guidelines without having to actively police these guidelines since they are automatically enforced through the compliance computer system 200. The compliance computer system 200 enforces these guidelines by reviewing this information, at least, against one or more requirements of a compliance standard associated with the local guidelines. Accurate and proper coding of compliance standard 340 information is important because it helps determine eligibility for benefits provided by the compliance standard 340. Accordingly, the reference library 344 ensures compliance with up-to-date regulations and policies, such as those that are not directly configured by an administrator of the compliance computer system 200.

In some embodiments, other databases are communicatively linked (e.g., linked through communication network 106 of FIG. 1) to the compliance computer system 200. For instance, in some embodiments, one or more communications stored on an external database store (e.g., a cloud database) is provided to the compliance computer system 200.

Each of the above identified modules and applications correspond to a set of executable instructions for performing one or more functions described above and the methods described in the present disclosure (e.g., the computer-implemented methods and other information processing methods described herein; method 600 of FIGS. 6A through 6D; etc.). These modules (e.g., sets of instructions) need not be implemented as separate software programs, procedures or modules, and thus various subsets of these modules are, optionally, combined or otherwise re-arranged in various embodiments of the present disclosure. In some embodiments, the memory 292 optionally stores a subset of the modules and data structures identified above. Furthermore, in some embodiments, the memory 292 stores additional modules and data structures not described above.

Figure 4:
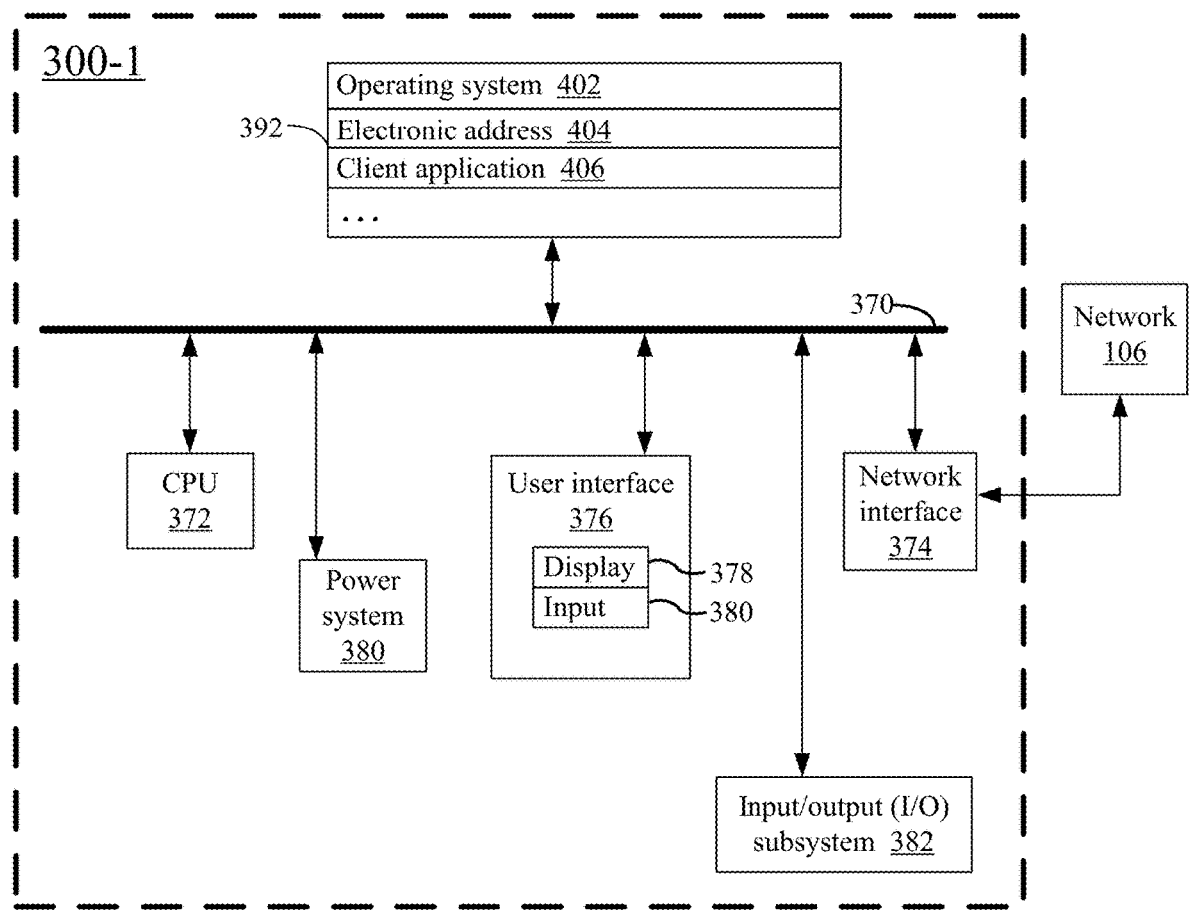
FIG. 4 illustrates a client device, in accordance with an exemplary embodiment of the present disclosure.

Referring to FIG. 4, a description of an exemplary client device 300 that can be used with the present disclosure is provided. In some embodiments, a client device 300 includes a smart phone (e.g., an iPhone, an Android device, etc.), a laptop computer, a tablet computer, a desktop computer, a wearable device (e.g., a smart watch, a heads-up display (HUD) device, etc.), a television (e.g., a smart television), or another form of electronic device such as a gaming console, a stand-alone device, and the like.

The client device 300 illustrated in FIG. 4 has one or more processing units (CPU's) 372, a network or other communications interface 374, a memory 392 (e.g., random access memory), a user interface 376, the user interface 376 including a display 378 and input 380 (e.g., keyboard, keypad, touch screen, etc.), optional audio circuitry, an optional speaker, an optional microphone, an optional input/output (I/O) subsystem 380, one or more communication busses 370 for interconnecting the aforementioned components, and a power system 382 (e.g., power supply) for powering the aforementioned components.

In some embodiments, the input 380 is a touch-sensitive display, such as a touch-sensitive surface. In some embodiments, the user interface 376 includes one or more soft keyboard embodiments. In some embodiments, the soft keyboard embodiments include standard (e.g., QWERTY, QWERTZ, etc.) and or non-standard configurations of symbols on the displayed icons. The input 380 and/or the user interface 376 is utilized by an end-user of the respective client device 300 (e.g., a respective subject) to input various information (e.g., a text object within a message) to the respective client device.

In some embodiments, the client device 300 illustrated in FIG. 4 optionally includes, in addition to accelerometer(s), a magnetometer, and a global positioning system (GPS or GLONASS or other global navigation system) receiver for obtaining information concerning a current location (e.g., a latitude, a longitude, an elevation, etc.) and/or an orientation (e.g., a portrait or a landscape orientation of the device) of the client device 300. In some embodiments, the location of the client device 300 provides information related to a respective compliance standard 340 (e.g., a location of the client device is associated with Germany signaling such that German compliance standards 340 are selected when determining if a request to configure a respective workforce status tool satisfies one or more compliance requirements 326 associated with a corresponding compliance standard 340). Thus, in some embodiments, the location of the client device 300 provides information related to a respective compliance standard that a respective subject is or is not eligible for (e.g., the location of the client device is associated with Germany signaling the respective subject is under German jurisdiction for one or more compliance standards). In some embodiments, the location of the client device sets the language. However, the present disclosure is not limited thereto. In some embodiments, the location of the client device is not used to set the language. For instance, in some embodiments, the device default language or the subject's login profile sets the language. In some embodiments, the location of the client device is not used to set the compliance standard. Rather, the systems and methods of the present disclosure query the respective subject for location information, and based on the answers to these queries, identifies the relevant compliance standard.

It should be appreciated that the client device 300 illustrated in FIG. 4 is only one example of a multifunctional device that may be used for receiving compliance information, providing requests, evaluating a request, presenting updated compliance information, or a combination thereof. Thus, the client device 300 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits. In some embodiments, the client device 300 is a desktop or laptop computer.

The memory 392 of the client device 300 illustrated in FIG. 4 optionally includes high-speed random access memory and optionally also includes non-volatile memory, such as one or more magnetic disk storage devices, flash memory devices, or other non-volatile solid-state memory devices. Access to the memory 392 by other components of the client device 300, such as CPU(s) 372 is, optionally, controlled by the memory controller.

In some embodiments, the one or more CPU(s) 372 run or execute various software programs and/or sets of instructions stored in the memory 392, such as the client application 406, to perform various functions for the client device 300 and process data.

In some embodiments, the CPU(s) 372 and the memory controller are implemented on a single chip. In some other embodiments, the CPU(s) 372 and the memory controller are implemented on separate chips.

In some embodiments, the audio circuitry, the optional speaker, and the optional microphone provide an audio interface between the respective subject and the client device 300, enabling the client device to provide a message that include audio data provided through the audio circuitry, the optional speaker, and/or the optional microphone. The audio circuitry receives audio data from the peripherals interface, converts the audio data to electrical signals, and transmits the electrical signals to the speaker. The speaker converts the electrical signals to human-audible sound waves. The audio circuitry also receives electrical signals converted by the microphone from sound waves. The audio circuitry converts the electrical signal to audio data and transmits the audio data to peripherals interface for processing. Audio data is, optionally, retrieved from and or transmitted to the memory 392 and or the RF circuitry by the peripherals interface.

In some embodiments, the power system 384 optionally includes a power management system, one or more power sources (e.g., one or more batteries, alternating current (AC)), a recharging system, a power failure detection circuit, a power converter or inverter, a power status indicator (e.g., a light-emitting diode (LED)) and any other components associated with the generation, management, and distribution of power in portable devices.

In some embodiments, the client device 300 optionally also includes one or more optical sensors. The optical sensor(s) optionally include charge-coupled device (CCD) or complementary metal-oxide semiconductor (CMOS) phototransistors. The optical sensor(s) receive light from the environment, projected through one or more lens, and converts the light to data representing an image. The optical sensor(s) optionally capture still images and or video. In some embodiments, an optical sensor is disposed on a back end portion of the client device 300 (e.g., opposite the display 378 on a front end portion of the client device 300) so that the input 380 is enabled for use as a viewfinder for still and or video image acquisition. In some embodiments, another optical sensor is located on the front end portion of the client device 300 so that an image of the respective subject is obtained (e.g., to capture a user profile image). In some embodiments, a request provided by the client device includes an image and or video captured by the optical sensor (e.g., the request includes a video feed or an image such as a picture).

In some embodiments, the memory 392 of the client device 300 stores:
  an operating system 402 that includes procedures for handling various basic system services;
  an electronic address 404 associated with the client device 300; and
  a client application 406 for presenting media, such as a communications platform for providing and receiving a plurality of messages within a respective communication channel and/or communicating a request to configure a workforce status tool.

As illustrated in FIG. 4, a client device 300 preferably includes an operating system 402 that includes procedures for handling various basic system services. The operating system 402 (e.g., iOS, ANDROID, DARWIN, RTXC, LINUX, UNIX, OS X, WINDOWS, or an embedded operating system such as VxWorks) includes various software components and or drivers for controlling and managing general system tasks (e.g., memory management, storage device control, power management, etc.) and facilitates communication between various hardware and software components.

An electronic address 404 is associated with each client device 300, which is utilized to at least uniquely identify the client device from other devices and components of the system 100. In some embodiments, the electronic address 404 of the client device 300 has the same functionality as the electronic address 304 of the compliance computer system 200. However, the present disclosure is not limited thereto.

Figure 8:
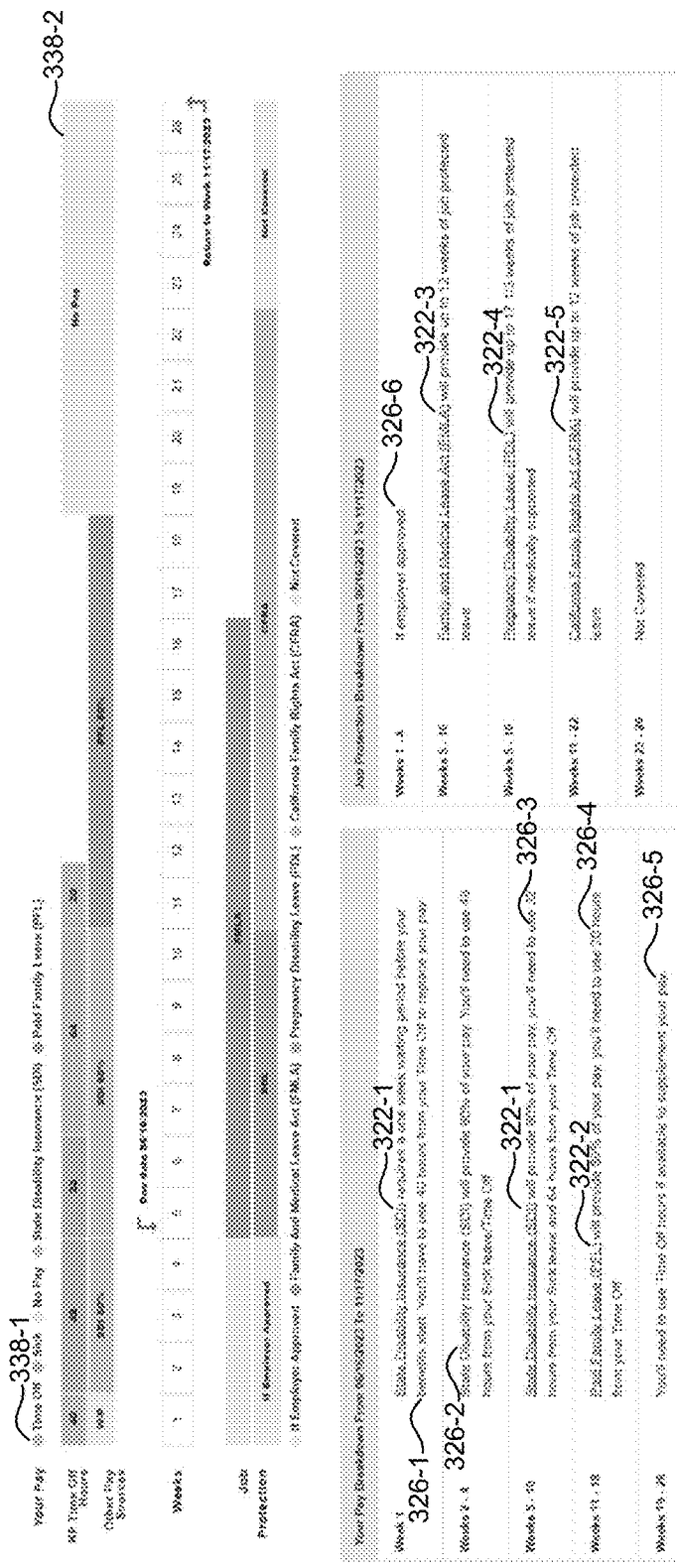
FIG. 8 illustrates a user interface of a display of a client device that allows an end-user to review a corresponding report generated for a respective subject, in accordance with an exemplary embodiment of the present disclosure.
Figure 11:
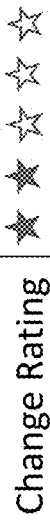
FIG. 11 illustrates a user interface of a display of a client device that allows an end-user to review a corresponding report generated for a respective subject, in accordance with an exemplary embodiment of the present disclosure.
Figure 12:
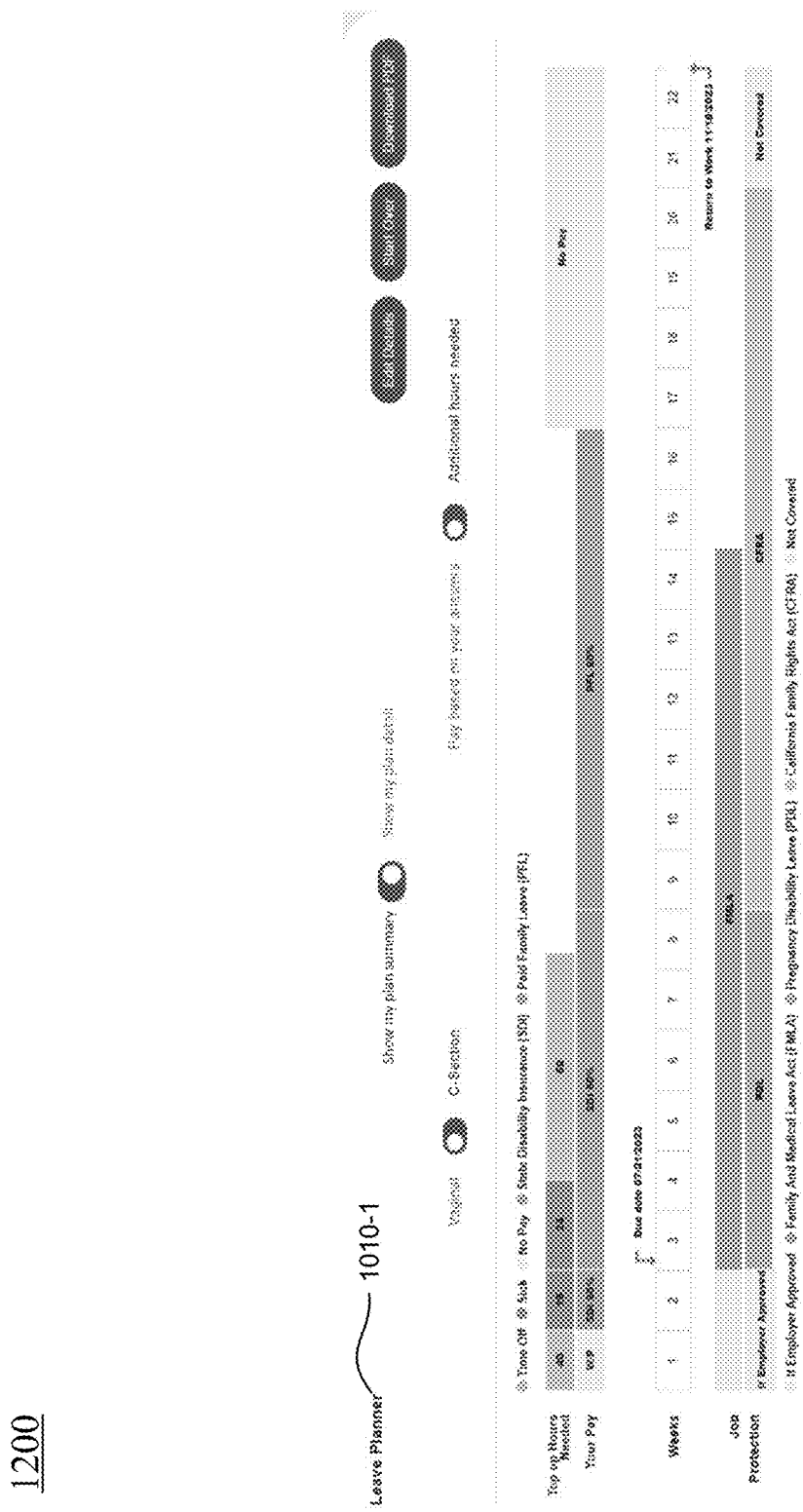
FIG. 12 illustrates a user interface of a display of a client device that allows an end-user to review a corresponding report generated for a respective subject, in accordance with an exemplary embodiment of the present disclosure.
Figure 14:
FIG. 14 illustrates a user interface of a display of a client device that allows an end-user to review a corresponding report including a graphical chart, in accordance with an exemplary embodiment of the present disclosure.

In some embodiments, the client application 406 is a group of instructions that, when executed by the processor 372, generates content for presentation to the respective subject (e.g., user interface 700 of FIG. 7, user interface 800 of FIG. 8, user interface 900 of FIG. 9, user interface 1000 of FIG. 10, user interface 1100 of FIG. 11, user interface 1200 of FIG. 12, user interface 1300 of FIG. 13, user interface 1400 of FIG. 14, user interface 1500 of FIG. 15, or a combination thereof), such as a result of a corresponding report (e.g., report 1210-1 of FIG. 12) generated by one or more models 310. In some embodiments, the client application 406 generates content in response to one or more inputs received from the respective subject through the client device 300, such as the inputs 380 of the client device 300.

In some embodiments, the client device 300 has any or all of the circuitry, hardware components, and software components found in the system depicted in FIG. 4. In the interest of brevity and clarity, only a few of the possible components of the client device 300 are shown to better emphasize the additional software modules that are installed on the client device.

Figure 5A:
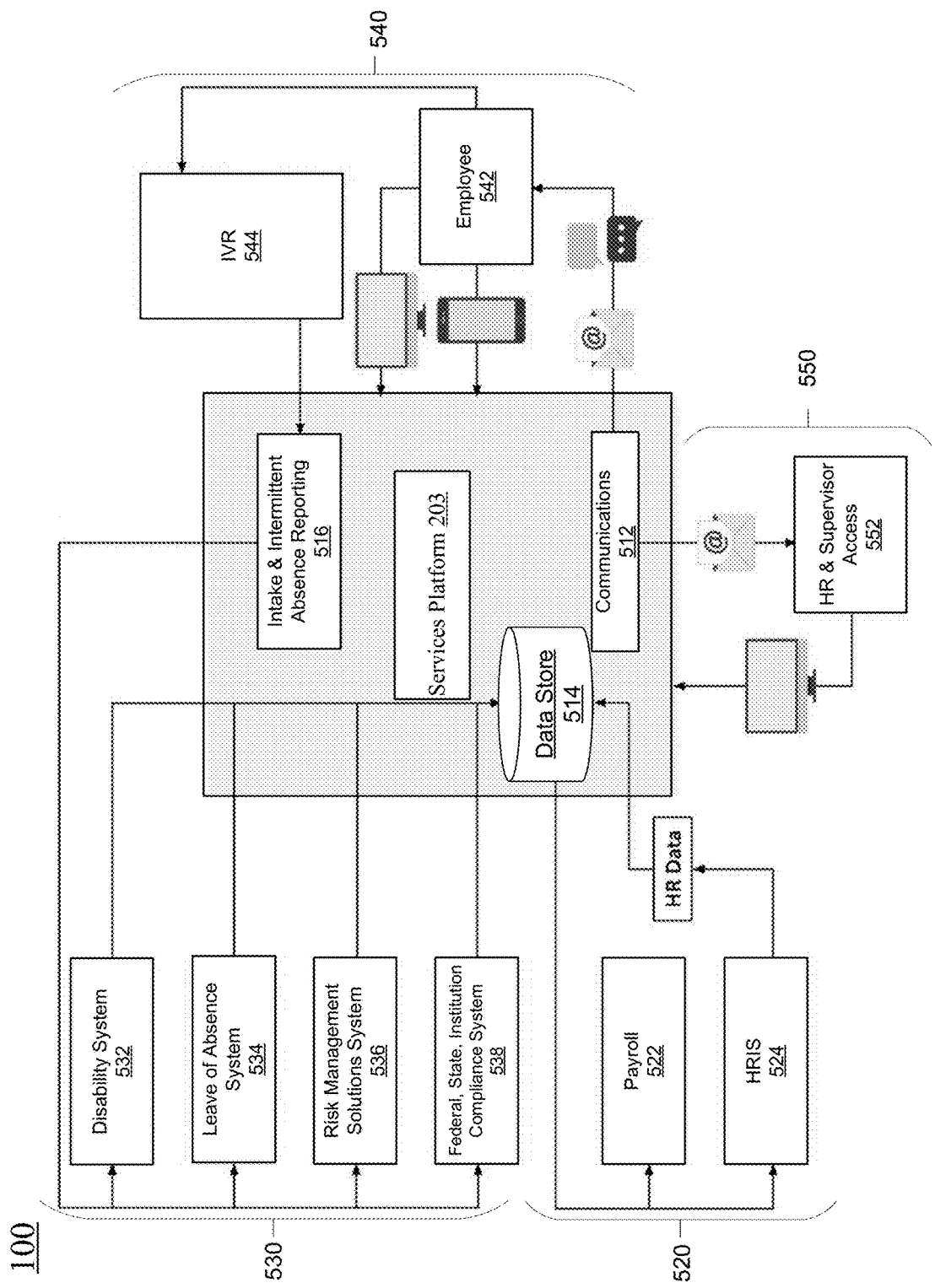
FIG. 5A illustrates an example service system for providing absentee management in accordance with some embodiments.
Figure 5B:
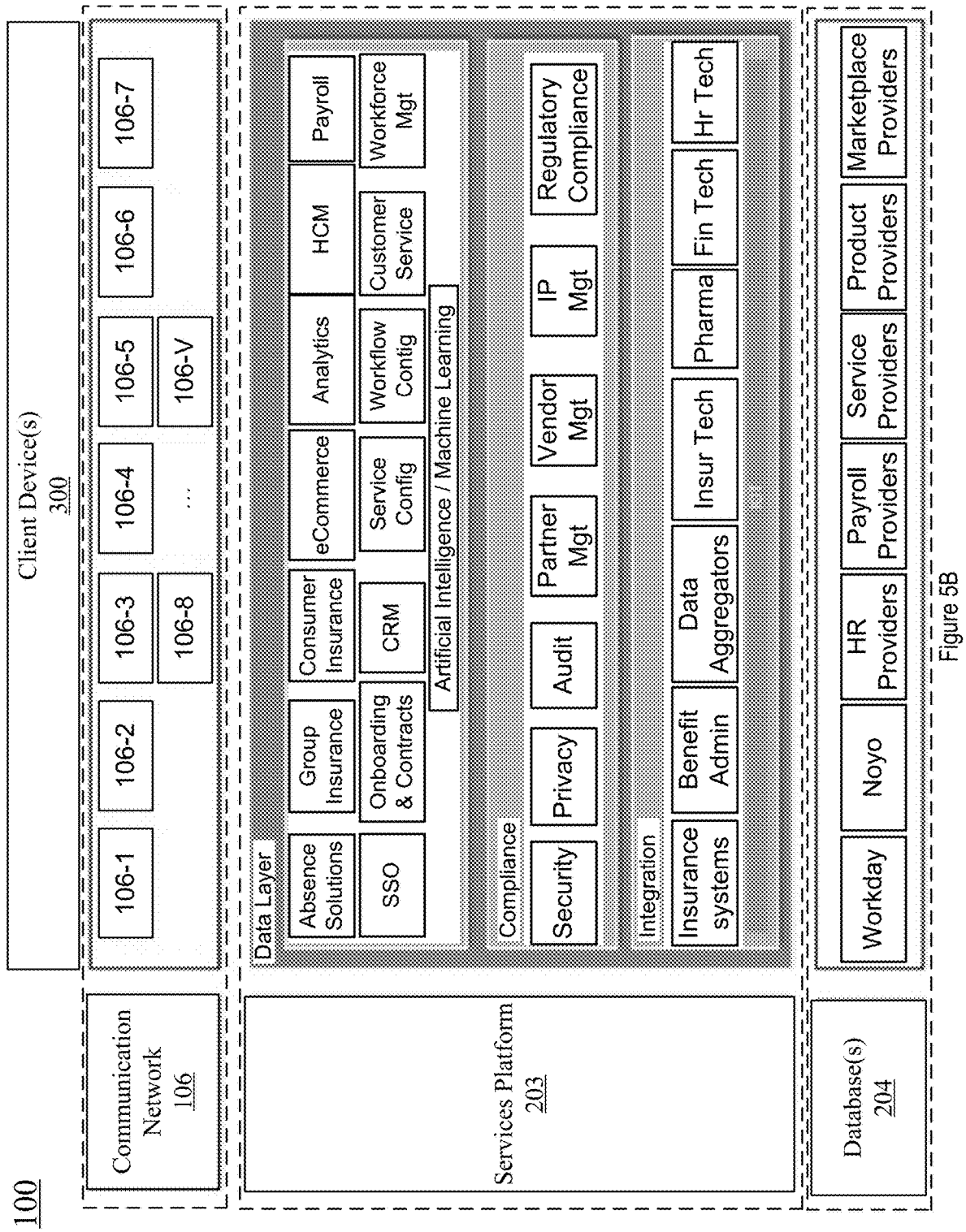
FIG. 5B illustrates a chart depicting another absentee management workflow, in accordance with an exemplary embodiment of the present disclosure.
Figure 5C:
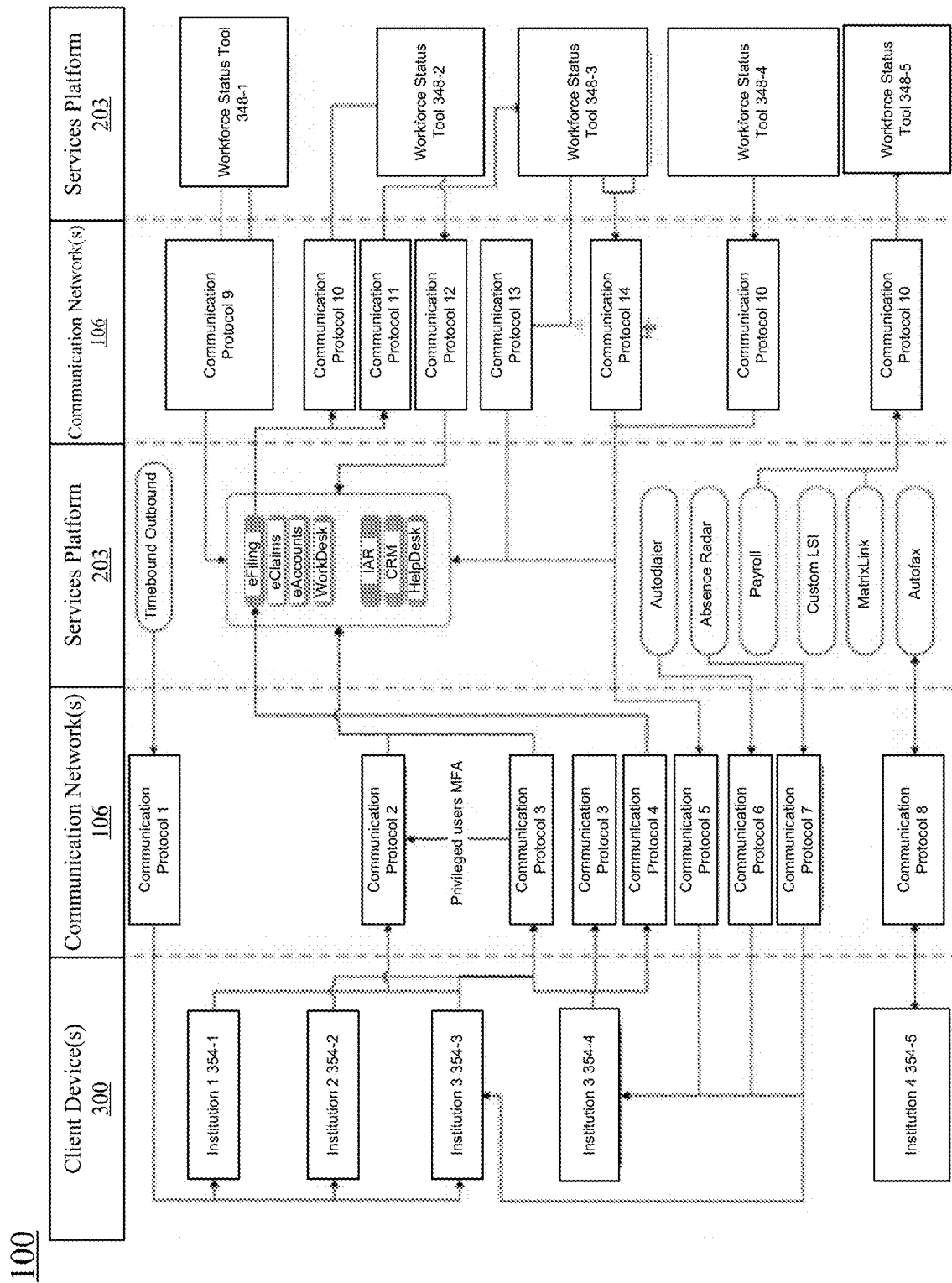
FIG. 5C illustrates a chart depicting yet another absentee management workflow, in accordance with an exemplary embodiment of the present disclosure.

FIGS. 5A, 5B, and 5C illustrate various workflows within a distributed computer system (e.g., distributed computer system 100 of FIG. 1) for providing updating compliance information and/or presenting subject specific compliance information in accordance with some embodiments of the present disclosure. For instance, as depicted in FIGS. 5A, 5B, and 5C, the distributed computer system 100 includes a communications platform 512 (e.g., the network communication module 306 of FIG. 3A and/or communications platform module 328 of FIG. 3B), that provides various services, such as status notifications and calendars (e.g., the notification module 316 and/or the calendar module 318 of FIG. 3A) and one or more workforce status tools 348 that is configured to implement a conditional logic for a corresponding workforce status category in an enumerated plurality of workforce status categories for a respective employee at a first institution 354 (e.g., a supervisor platform 540 and/or an employee platform 550 of FIG. 5A, client device 300 of FIG. 4, etc.) through a communications network (e.g., the communication network(s) 106 of FIG. 1). Furthermore, the distributed computer system 100 includes a data store platform 514 (e.g., memory 292 of FIGS. 3A through 3C) for storing data received from each institution 354, each client device 300, and/or an external server and/or device (e.g., data communicated through an absentee status feed and/or a demographic feed associated with a respective institution 354).

In some embodiments, each institution 354 communicates various information 520 to the compliance computer system 200 through the above-described communication network(s) 106. In some embodiments, the information 520 is communicated through a feed of information that is provided on a recurring basis, such as a periodic or non-periodic basis. In some embodiments, the information 520 includes a payroll information 522 and/or a human resource information system 524 (HRIS). In some such embodiments, the payroll information 522 and/or the HRIS 524 constitute the demographic feed and/or the absentee status feed. For instance, in some embodiments, the HRIS 524 stores each employee record associated with each respective employee of a respective institution (e.g., via organization tree 356 of FIG. 3C).

In some embodiments, from the information 520 provided to the service system 500, various services 530 are provided to each institution 354 through an intake and/or intermittent absence reporting platform 516, hereinafter "absence reporting platform 516." In some embodiments, the services 530 provided by the computer system 200 for a respective institution 354 include a disability system 532. In accordance with some embodiments, the disability system 532 helps ensure that each respective institution 354 complies with various disability regulations and requirements, such as the Americans with Disabilities Act with sets forth exact design requirements to suite persons with disabilities. For instance, in accordance with a determination that an absence claim is associated with a disability, this claim subjected to the disability system 532 in order to ensure that the claim adheres to proper compliance regulations. In some embodiments, the services 530 provided by the service system 500 for a respective institution 354 include a leave of absence system 534. The leave of absence system 534 helps ensure that each respective institution 106 complies with various absence regulations and requirements, such as FLMA. For instance, in accordance with a determination that an absence claim is associated with a leave specified by FLMA, this absence claim is subjected to the leave of absence system 534 in order to ensure that the claim adheres to proper compliance regulations. In some embodiments, the services 530 provided by the service system 500 for a respective institution 354 include a risk management solutions system 536. The risk management solutions system 536 ensures that each respective institution 106 is taking appropriate risks with respect to human resource policy and employee management. In some embodiments, the services 530 provided by the service system 500 for a respective institution 354 include a federal, state, and/or institution compliance system 538, hereinafter "compliance system," which helps ensure that an employee and/or institution 106 follows various regulation procedures and protocols. For instance, in some embodiments, the compliance system 538 processes each request 212 in order to either approve, deny, or cancel the request 212 depending on if the claim complies with various regulations, such as FLMA, based on one or more compliance requirements associated with a corresponding benefit 322 of the regulation.

In some embodiments, the above identified services 530 provided by the compliance computer system need not be implemented as separate services, and thus various subsets of these services may be combined or otherwise decoupled from one another in various embodiments. For instance, in some embodiments, the risk management solution system 536 and the compliance system 538 are subsumed as one system. Similarly, in some embodiments, the disability system 532, the leave of absence system 534, the risk management solutions system 536, the compliance system 538, or a combination thereof are subsumed as one service.

In some embodiments, an employee 542 communicates pertinent information related to a request and/or an absence claim, such as an employee requesting a change to an internal procedure of the first institution 354-1 when reporting an intermittent absence for a temporary migraine. However, the present disclosure is not limited thereto. In some embodiments, the employee 542 communicates directly to their respective institution 354, their respective supervisor and/or, as depicted in FIG. 5A, commutates directly to the compliance system 200. In some embodiments, (e.g., where the employee 542 communicates directly to the service system 500) an interactive voice response (IVR) system 544 is compliance system 500 without further human interaction aside from the employee 542, such as by using an automated human interface module 332 of the communication platform 512. In accordance with some embodiments, the IVR system 544 allows each respective employee to communicate pertinent information without interaction with another human, and without consuming valuable time of a supervisor or HR representative. Accordingly, in some embodiments, the present disclosure allows for a respective employee to communicate a request to change a first workforce status tool 348-1 and determine if the change for the first workforce status tool 348-1 satisfies one or more compliance requirements 326 associated with a corresponding benefit 322 without interaction with another human, and without consuming valuable time of a supervisor or HR representative.

In some embodiments, in accordance with a determination that information (e.g., a respective workforce status tool 348) needs to be communicated to and/or accessed 552 by a respective employee of an institution 354 (e.g., a supervisor and/or HR representative of the institution 354), the communication platform 512 provides such information to a respective application (e.g., client application 406 of FIG. 4) and/or a client device 300. In some embodiments, the information is provided through a client application 406 that is accessible through a communication network 106, such as the Internet. In some embodiments, this client application 406 includes, but is not limited to, a mobile phone application and/or a web portal application. However, the present disclosure is not limited thereto. For instance, in some embodiments, the information is provided through an email communicated to respective employee. Moreover, in some embodiments, the information is provided through a push notification communicated to a respective client device 300.

Now that a general topology of the distributed system 100 has been described in accordance with various embodiments of the present disclosures, details regarding some processes in accordance with FIGS. 6A through 6D will be described.

FIGS. 6A through 6D illustrate a flow chart of methods (e.g., method 600) for updating compliance information provided by a respective subject and/or presenting subject-specific information for a compliance standard 340 based on the update of the compliance information, in accordance with embodiments of the present disclosure. Specifically, exemplary method 600 is directed to updating and presenting subject-specific compliance standard information, in accordance with some embodiments of the present disclosure. In the flow charts, the preferred parts of the methods are shown in solid line boxes, whereas optional variants of the methods, or optional equipment used by the methods, are shown in dashed line boxes.

Various modules in the memory 292 of the compliance computer system 200 (e.g., network communication module 306, model library 308, benefits data module 320, communications platform module 328, reference library 344, workforce status tool module 346, server data modules 350, or a combination thereof of FIGS. 3A, 3B, and 3C), the memory 392 of the client device 300 (e.g., client application 406 of FIG. 4), or both perform certain processes of the methods 600 described in FIGS. 6A through 6D, unless expressly stated otherwise. Furthermore, it will be appreciated that the processes in FIGS. 6A through 6D can be encoded in a single module or any combination of modules.

Block 602. Referring to block 602 of FIG. 6A, a method for updating and/or presenting subject-specific compliance standard information is provided.

The method 600 is performed at a computer system (e.g., compliance computer system 200 of FIGS. 3A through 3C and/or client device 300 of FIG. 4). The compliance computer system 200 includes one or more processors (e.g., CPU(s) 272 of FIG. 3A) and a memory (e.g., memory 292 of FIGS. 3A through 3C). In some embodiments, the compliance computer system 200 enables both employees (e.g., a respective subject) and managers (e.g., an administrator of the compliance computer system 200 or a privileged user of the compliance computer system 200) of one or more institutions to access and interact with information managed and/or provided to the compliance computer system 200.

As such, portions of the method 600 require a computer (e.g., compliance computer system 200 of FIG. 1, client device 300 of FIG. 4, etc.) to be used because the considerations used by the systems and methods of the present disclosure, on the scale performed by the systems and methods of the present disclosure, cannot be mentally performed. In other words, the systems and methods of the present disclosure have outputs (e.g., report 1510 of FIG. 15) that needs to be determined using the computer rather than mentally in such embodiments.

Furthermore, in some embodiments, the method 600 is performed for each respective subject in a plurality of subjects. In some embodiments, the plurality of subjects includes more than 10 subjects, more than 50 subjects, more than 100 subjects, more than 250 subjects, more than 500 subjects, more than 1,000 subjects, more than 5,000 subjects, more than 10,000 subjects, or more than 50,000 subjects (e.g., about 65,000 subjects). In some embodiments, the plurality of subjects includes at least 10 subjects, at least 50 subjects, at least 100 subjects, at least 250 subjects, at least 500 subjects, at least 1,000 subjects, at least 5,000 subjects, at least 10,000 subjects, or at least 50,000 subjects (e.g., about 65,000 subjects). Accordingly, the method 600 is capable of provided individualized evaluations of subject specific compliance standard information for each respective subject in the plurality of subjects. Furthermore, given the scale of the plurality of subjects, the methods 600 of the present disclosure cannot be mentally performed, and, therefore, require utilizing the compliance computer system 200.

Block 604. Referring to block 604, the method 600 includes storing, in electronic form, one or more workforce status tools (e.g., workforce status tools 348 of workforce status tool module 346 of FIG. 3C). In some embodiments, each workforce status tool 348 in the one or more workforce status tools 348 is configured to implement a conditional logic (e.g., conditional logic 1810 of FIG. 18, first model 310-1 of FIG. 3A, etc.) for a corresponding workforce status category in an enumerated plurality of workforce status categories for a respective employee at a first institution. For instance, in some such embodiments, the respective employee is a human resources (HR) administrator employed by the first institution that facilitates tracking and/or managing a status of a workforce (e.g., population of employees of the first institution).

Block 606. Referring to block 606, in some embodiments, the one or more workforce status tools 348 facilitates tracking and/or managing the status of the workforce by utilizing one or more conditional logics to manage performance of a respective employee, monitor absenteeism of the respective employee, and the like. As a non-limiting example, in some embodiments, the one or more workforce status tools 348 include an account services tool, a digital security tool workforce status tool 348-2), a physical security tool, a facility security tool, an intake tool, a leave status tool, a reporting tool, an administrative tool, a benefits tool, a stock purchase plan tool, a performance review tool, a workload management tool, a demographic tool, a notification tool, a task management tool, a billing tool, a support tool, a training tool, a correspondence tool, a compliance tool, a utility tool, a feedback tool, a medical outreach tool, or a combination thereof.

Block 608. Referring to block 608, in some embodiments, the enumerated plurality of workforce status categories includes a finite number of categories, such as two or more workforce status categories that have been particularly defined by a human. In some embodiments, the enumerated plurality of workforce status categories includes more than 10 subjects, more than 50 subjects, more than 100 subjects, more than 250 subjects, more than 500 subjects, more than 1,000 subjects, more than 5,000 subjects, more than 10,000 subjects, or more than 50,000 subjects (e.g., about 65,000 subjects). As a non-limiting example, in some embodiment, the enumerated plurality of workforce status categories includes a performance workforce status category, a maternity leave workforce status category, a short-term disability workforce status category, a longer-term disability workforce status category, a sick leave workforce status category, a fostering or adopting workforce status category, an employer program workforce status category, a surrogacy workforce status category, a parental workforce status category, a pre-natal leave workforce status category, a newborn baby bonding leave workforce status category, a caregiver leave workforce status category, a military service leave workforce status category, a paid time off (PTO) leave workforce status category, a vacation workforce status category, or a combination thereof. For instance, in some embodiments, the sick leave workforce status category is associated with a first period of time a respective employee is allowed to be absent from working at an institution when the respective employee is sick, ill, or injured, such as a predetermined number of years for the respective employee. As another non-limiting example, in some embodiments, the military service leave workforce status category is associated with a second period of time the respective employee is allowed to be absent from working at the institution when the respective employee is an active duty service member, reservist service member, or the like. However, the present disclosure is not limited thereto.

Block 610. Referring to block 610, in some embodiments, the method 600 further includes receiving a request to configure a first workforce status tool (e.g., workforce status tool 348-1 of FIG. 3C) in the one or more workforce status tools in the enumerated plurality of workforce statuses (e.g., request 212 of FIG. 2). In some embodiments, the request is received in electronic form via a communication network (e.g., communication network 106 of FIG. 1, communication network 106 of FIG. 3A, communication network 106 of FIG. 4, etc.). For instance, in some embodiments, the request is received in accordance with an input (e.g., input 380 of FIG. 4) provided through a client device through a client application 406), such as in one or more tables presented through a graphical user interface (GUI) 376. Accordingly, in some such embodiments, the method 600 allows for a respective employee at a first institution to communicate the request to configure the respective workforce status tool using the GUI, which requires less skill by the respective employee and is easier to maintain, manage, test or a combination thereof in comparison to a command line interface ("CLI") (e.g., code) user interface. However, the present disclosure is not limited thereto. For instance, rather than having to manually configure, by CLI, the first employee is enabled to submit the request using a simple-to-use configuration. As a non-limiting example, in some embodiments, a first benefit associated with obtaining leave for a military leave workforce status category includes a first compliance requirement 326-1 that the respective employee be eligible for reemployment rights if a cumulative period of time of military service by the respective employee causes one or more respective absences from a position of employment at the first institution that does not exceed five years. Moreover, in some such embodiments, the request to configure the first workforce status tool (e.g., compliance workforce status tool 348-3 of FIG. 3B) includes a request to include an exception to the first compliance requirement 326-1 in accordance with a determination that the respective employee is ordered to service, or to remain on active duty (e.g., other than for training) because of a war or national emergency declared by the President or Congress of the United States. However, the present disclosure is not limited thereto.

Accordingly, in some embodiments, each requirements 326 provide one or more constraints or conditions in accordance with a corresponding conditional logic that defines eligibility for a corresponding benefit 322, such as a first benefit associated with a first workforce status category. In some embodiments, the requirements 326 includes: a number of consecutive hours a subject is allowed to work without a break; a maximum number of hours a subject is allowed to work during a given time period, such as a week, a month, a fiscal quarter, a calendar year, etc.; one or more qualifications and/or one or more experiences needed by the subject (e.g., 500 hours experience each calendar year); or the like. However, the present disclosure is not limited thereto.

In some embodiments, a respective requirement 326 is specific for one or more subjects working in certain particular industries or fields. As a non-limiting example, a first requirement 326 of a first benefit 332-1 for Leave Without Pay (LWOP), which provides a temporary non-pay status and absence from duty, for a subject that is an Engineer and a second requirement 326-2 of the first benefit 322-1 for the subject that is a medical practitioner. One of skill in the art will appreciate that the systems and methods of the present disclosure are not limited thereto.

In some embodiments, the respective subject belongs to one or more unions or other identified employer groups, such that one or more requirements 326 is configured by a collective bargaining agreement between the one or more union or other identified institution groups and the respective institution that employs the respective subject. In some embodiments, the collective bargaining agreement is stored for reference, such as when request to change the corresponding conditional logic of a respective requirement 326 requires updating due to new terms in the agreement (e.g., stored within reference library 344 of the compliance computer system 200 of FIG. 3B). As a non-limiting example, in some embodiments, the one or more requirements 3226 include a first requirement 326-1 that defines a minimum number of hours that a subject is guaranteed to work, a second requirement 326-2 that defines a number of allowed vacation days, sick days, etc. for the respective subject, and the like.

Accordingly, in some embodiments, the request 212 to configure the first workforce status tool 348-1 is associated with a first employee of the first institution. As a non-limiting example, in some embodiments, the request 212 is associated with the first employee of the first institution by including an identifier, such as an electronic address 404 of FIG. 4 or an employment identifier, that communicates an identity of the first employee. In some embodiments, each request 212 includes, or forms, a data construct which is a basis of a determination (e.g., block 630 of FIG. 3B, block 634 of FIG. 6C, block 640 of FIG. 6C, etc.), provided by the compliance computer system 200. In some embodiments, the request 212 includes information identifying a source of the message (e.g., a first message 1010-1 includes information, such as electronic address 304, identifying a first client device 300-1 of FIG. 3 as a source of the first message, etc.).

For instance, in some embodiments, the first employee is an administrator, such as a HR administrator at the first institution, a supervisor at the first institution, an executive at the first institution, a board member at the first institution, a manager at the first institution (e.g., a project manager), or a combination thereof that is authorized to facilitate changes to a respective workforce status tool 348-1. However, the present disclosure is not limited thereto.

Moreover, in some embodiments, the request 212 to configure the first workforce status tool 348-8 includes a change of at least an output dependency or an input dependency of a corresponding conditional logic associated with the first workforce status tool. Collectively, each output dependency and each input dependency of the corresponding conditional logic affect a result when the corresponding conditional logic is applied by the computer system. As a non-limiting example, in some embodiments, the input dependency is, at least in part configured to produce a respective result when applied to a corresponding input. For instance, in some embodiments, the change of the input dependency includes a change from a first requirement that the respective employee be employed at the first institution for at least six months to a second requirement that the respective employee be employed at the first institution for at least twelve months in order to be eligible for a corresponding benefit 322.

In some embodiments, the corresponding conditional logic is configured by an administrator associated with the respective institution 354 that employs a respective subject. As a non-limiting example, in some embodiments, the method 600 provides an ability to create, manage, administer, or a combination thereof the automated human interface module 322 by configuring one or conditional logics associated with a respective workforce status tool 348, which implements the conditional logic for a corresponding workforce status category in an enumerated plurality of workforce status categories, which further utilized by the automated human interface module 322 via a communication channel user interface. For instance, in some embodiments, the administrator uses a user interface 376 based automated message flow builder or uploads VXML, or properly formatted JSON files, in order to communicate the request to change the corresponding conditional logic.

For instance, referring to FIG. 16, in some embodiments, a user interface 1600 allows an end-user to configure a conditional logic (e.g., form a New Question). In some embodiments, the configuration of the conditional logic allows for forming an association between the compliance requirement 326, a benefit 322, a node 336, or a combination thereof associated with a workforce status category 338 via the workforce status tool 348. As a non-limiting example, a first compliance requirement 326-1 includes a predetermined compliance question that is configured through the user interface 1600 by the first employee to have a general association, such that the predetermined compliance question, which communicates a message (e.g., message 1010-1 of FIG. 7, message 1010-1 of FIG. 8, message 1010-1 of FIG. 9, message 1010-1 of FIG. 10, message 1010-1 of FIG. 11, message 1010-1 of FIG. 12, message 1010-1 of FIG. 13, message 1010-1 of FIG. 14, message 1010-1 of FIG. 15, message 1010-1 of FIG. 16, message 1010-1 of FIG. 17, which appears in the communication channel 330) in a communication channel 330 asking a subject "Do you have a spouse or partner who works for the same employer?" is applicable, or associated with, each benefit 332 and/or workforce status category 338. In some such embodiments, the user interface 1600 further allows the first employee to configure a response type (e.g., an enumerated response type) the subject is allowed to provide within a message when prompted with the predetermined compliance question, such as by changing one or more input dependencies of the conditional logic. For instance, the logical condition configured through the user interface 1600 allows for the subject to select from a multiple choice response, as opposed to a short text free form response, a dropdown menu response, a date response, or a combination thereof. However, the present disclosure is not limited thereto. Accordingly, the change in the conditional logic configured by the first employee allows for the creation and/or modification of underlying content and functional flow logic structure of the node graph 334 based on an association between a respective node 336 and a requirement 326 of a corresponding benefit 322 for which the node 336 is configured to prompt the subject for information in furtherance of satisfying the requirement 326 via the corresponding conditional logic. In this way, at least a subset of the nodes 336 in the node graph 334 are customized by the first employee so that they each are associated with one or more compliance requirements 326 for subjects, where such subjects are employed by a respective institution that is bound by workforce status categories 338, and where such conditional logic seeks to determine whether subjects comply with these applicable requirements in order to be eligible for the corresponding benefits 322. Moreover, by allowing the end-user to configure a respective workforce status tool that implements the requested change to the conditional logic, such as a HR representative of the institution 354 for the user, the first employee is allowed to request changes in a manner that is particular to a subject at the institution, such as by using language within a text string specific to the institution.

Block 612. Referring to block 612, in some embodiments, the first workforce status tool 348-1 is further configured to implement a data access protocol. In some embodiments, the data access protocol is unique to the first institution. However, the present disclosure is not limited thereto. For instance, in some embodiments, the data access protocol is unique to the compliance computer system 200 and/or a database associated with the compliance computer system. In some embodiments, the data access protocol is associated with obtaining personal identifiable information of a respective user, such as the first employee. As a non-limiting example, in some embodiments, the method 600 uses one or more outbound application programming interfaces (APIs) that is configured for a respective subject to communicate a request 212, such as a leave status interface (LSI) request to a corresponding institution. In some embodiments, the data access protocol is used as part of a security layer of an outbound API. For example, in some embodiments, a tenant API supports X.509 authentication data access protocol. In some such embodiments, the outbound API acts as the client and is required to present a valid secure sockets layer (SSL) certificate for the X.509 mutual authentication process when communicating with the tenant API. In some embodiments, once the X.509 certificate setup process is deemed complete, the client issues a username token to be sent in a simple object data access protocol (SOAP) message security header. In some embodiments, a username token is added to the properties file that is read by the background process when constructing SOAP messages to send to the tenant API. In some embodiments, each SOAP message includes an extensible markup language (XML) digital signature to verify its authenticity. However, the present disclosure is not limited thereto. In some embodiments, the data access protocol is configured to implement a read privilege, a write privilege, an execute privilege, a move privilege, a rename privilege, an append privilege, a change access privilege, a change attribute privilege, an overwrite privilege, or a combination thereof. For instance, in some embodiments, the data access protocol grants access to read and/or write information of a file associated with the first workforce status tool 348-1 to a first plurality of employees at a first institution and a second plurality of employees at a second institution. By way of example, in some embodiments, the granted access allows for an end-user to write a portion of the first workforce status tool 348-1 (e.g., a free-space portion).

Block 614. Referring to block 614, in some embodiments, the first employee is an administrator of the first institution. Moreover, in some such embodiments, the user For instance, in some such embodiments, the first employee is responsible for managing and/or supervising one or more supervisee employees of the first institution, such as a HR administrator at the first institution, a supervisor at the first institution, an executive at the first institution, a board member at the first institution, a manager at the first institution (e.g., a project manager), or a combination thereof Moreover, the user is an employee of the first institution different than the administrator. In some embodiments, the one or more supervisee employees of the first institution directly or indirectly report to the first employee. However, the present disclosure is not limited thereto. For instance, in some embodiments, the user is an employee of the first institution different than the administrator, such that the user and the first employee are not the same human. As a non-limiting example, in some embodiments, the user is an intern employee at the first institution, and the first employee is an HR administrator at the first institution. However, the present disclosure is not limited thereto.

Block 616. Referring to block 616 of FIG. 6B, in some embodiments, the first institution 354-1 is a federal government institution, a state government institution, a county government institution, a municipal government institution, a private institution, a for-profit institution, a non-profit institution, an insurance institution, or a combination thereof. For instance, in some embodiments, the first institution is a company or other type of organization (e.g., having an institution absence policy), such as a partnership. However, the present disclosure is not limited thereto. In some embodiment, the first institution 354-1 provides a respective benefit 322, such as Department of Veteran Affairs providing a military leave benefit that is utilized by a variety of different institutions. For instance, in some embodiments, a respective benefit 22 is specific to a respective government institution or service, a respective institution that employs the respective subject (e.g., employer), or both. For instance, in some embodiments, the benefit 322 is configured, or administrated by, an institution such as a government, an industry, a union, or an employer of the respective subject. As a first non-limiting example, consider the Family Medical Leave Act (FMLA) benefit 322 that is specific to the United States Federal government in accordance with the FMLA of 1993. However, the present disclosure is not limited thereto. Non-limiting examples of such government institutions or services include a regional government (e.g., world trade organization ("WTO"), a Federal government (e.g., Federal government of the United States, etc.), a State government (e.g., State of Florida), a Province government (e.g., Guangdong Province), county government (e.g., Monterey County), municipal government (e.g., Oakland City government), and the like. One of skill in the art will appreciate that wide variety of government institutions or services that are applicable to the systems and methods of the present disclosure.

Block 618. Referring to block 618, in some embodiments, the request 212 to configure the first workforce status tool 348-1 is provided, at least in part, from utilizing an input mechanism 380 of a client device 300. For instance, in some embodiments, the request 212 to configure the first workforce status tool 348-1 is provided, at least in part, from selecting a first menu item by the administrator through a user interface 376 of a display 378 of the client device 300, selecting a first button by the administrator through the user interface 376, providing an input in a text box by the administrator through the user interface 376, selecting a check box by the administrator through the user interface 376, selecting a first row and/or a first column in a first table by the administrator through the user interface 376, performing a custom action by the administrator through the user interface 376, moving a position of a slider by the administrator through the user interface 376, or a combination thereof.

Block 620. Referring to block 620, in some embodiments, referring briefly to chart 1800 of FIG. 18, the corresponding conditional logic includes one or more Boolean logic operations. For instance, in some embodiments, a first conditional logic describes an "AND" Boolean logic operation that requires both elements of the first conditional logic to be satisfied for a respective threshold to be deemed satisfied. A second logical operation describes an "OR" Boolean operation that requires any one element of the second logical operation to be satisfied for a respective compliance requirement 326 of a corresponding benefit 322 to be deemed satisfied. Moreover, a third conditional logic describes an "EXCLUSIVE OR (XOR)" Boolean logic operation that requires any one element of the third conditional logic to be satisfied and no other element satisfied for a respective compliance requirement 326 to be deemed satisfied. A fourth conditional logic describes a singular "NOT" Boolean logic operation that requires absence of an element of the fourth conditional logic to be satisfied for a respective compliance requirement 326 to be deemed satisfied. A fifth conditional logic describes a plural "NOT" Boolean logic operation that requires both absence of a first element and presence of a second element of the fifth conditional logic to be satisfied for a respective compliance requirement 326 to be deemed satisfied. In some embodiments, a conditional logic of a respective model 310 includes a combination of one or more of the above described conditional logic. For instance, in some embodiments, a respective conditional logic includes one or more AND, OR, XOR, or NOT operations within the respective conditional logic (e.g., an operation including an AND operation). As a non-limiting example, in some embodiments, the corresponding conditional logic includes an IF statement for controlling eligibility for a first benefit 322-1 in accordance with a determination that a first compliance requirement 326-1 is satisfied by a respective employee having obtained authorization for the first benefit 322-1 from a third party, such as a human medical practitioner associated with a second institution different than the first institution. However, the present disclosure is not limited thereto. In some embodiments, the corresponding conditional logic is configured to improve a quality of a user experience when a respective employee engages with a communications platform module (e.g., communications platform module 328 of FIG. 3B, block 644 of FIG. 6D), such as a threshold feedback score when presenting compliance information to the respective employee (e.g., block 640 of FIG. 6C).

Block 624. Referring to block 624, in some embodiments, the change of the at least the output dependency includes defining at least a total number of days a respective user is entitled to be absent from the first institution within a period of time. For instance, in some embodiments, the change of the at least the output dependency includes a requirement that a first total number of days associated with a first benefit 322-1 and a second total number of days associated with a second benefit 322-2 run concurrently when a respective employee is deemed eligible for both the first benefit 322-1 and the second benefit 322-2. In some embodiments, the change of the at least the output dependency includes a requirement that the first total number of days associated with the first benefit 322-1 and a third total number of days associated with a third benefit 322-3 run consecutively when the respective employee is deemed eligible for both the first benefit 322-1 and the third benefit 322-3. However, the present disclosure is not limited thereto. In some embodiments, the change of the at least the output dependency includes a requirement that the first total number of days associated with the first benefit 322-1 and a fourth total number of days associated with a fourth benefit 322-4 alternate when the respective employee is deemed eligible for both the first benefit 322-1 and the fourth benefit 322-4. In some embodiments, the change of the at least the output dependency includes a requirement that the first total number of days associated with the first benefit 322-1 and a fifth total number of days associated with a fifth benefit 322-5 run simultaneously when the respective employee is deemed eligible for both the first benefit 322-1 and the fifth benefit 322-5.

Figure 16A:
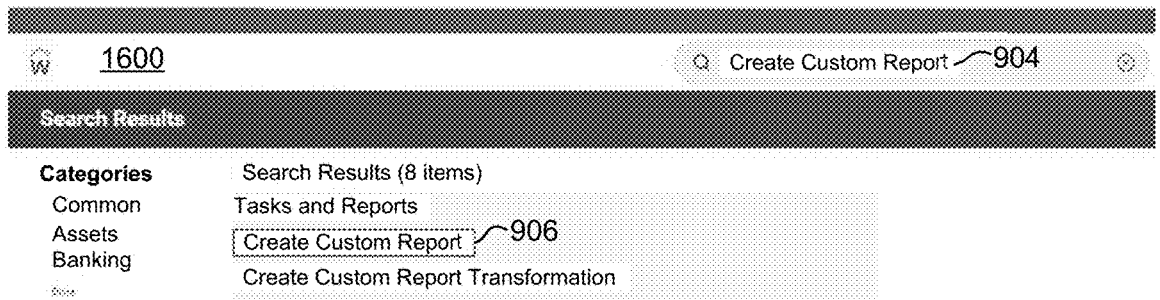
FIG. 16 illustrates a user interface of a display of a client device that allows an end-user to review a corresponding report including a third listing, in accordance with an exemplary embodiment of the present disclosure.
Figure 16B:
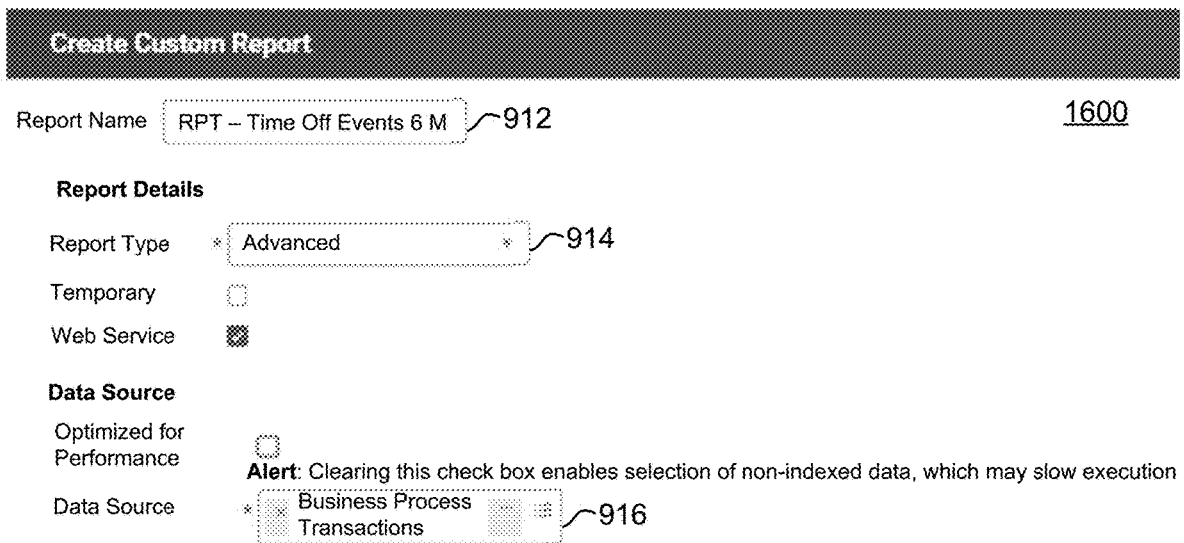
Figure 16C:
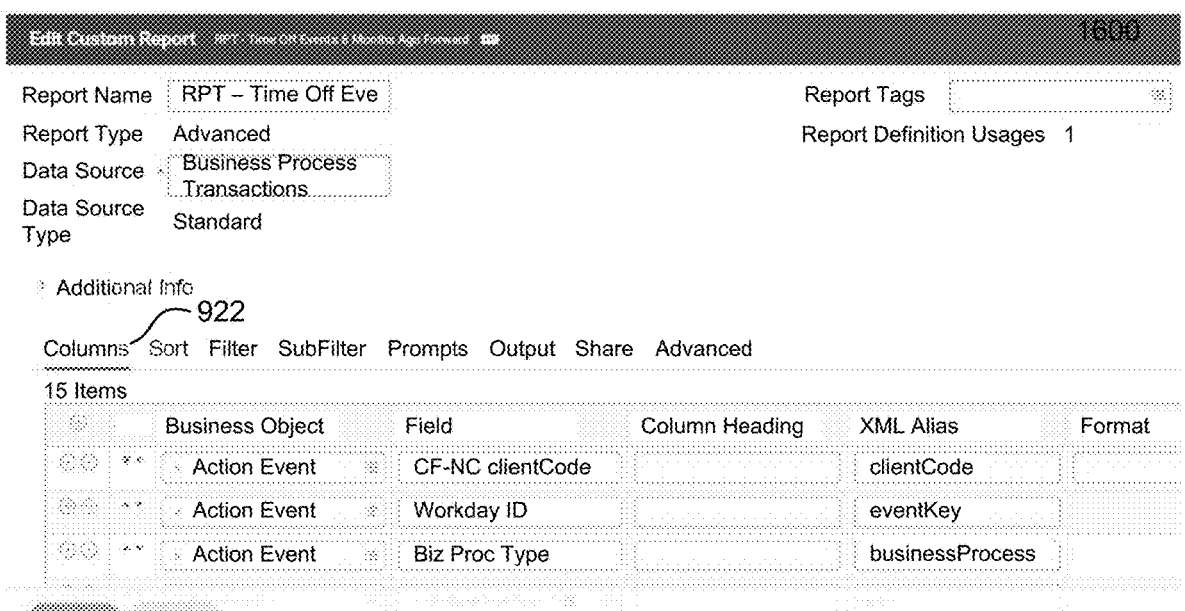
Figure 17:
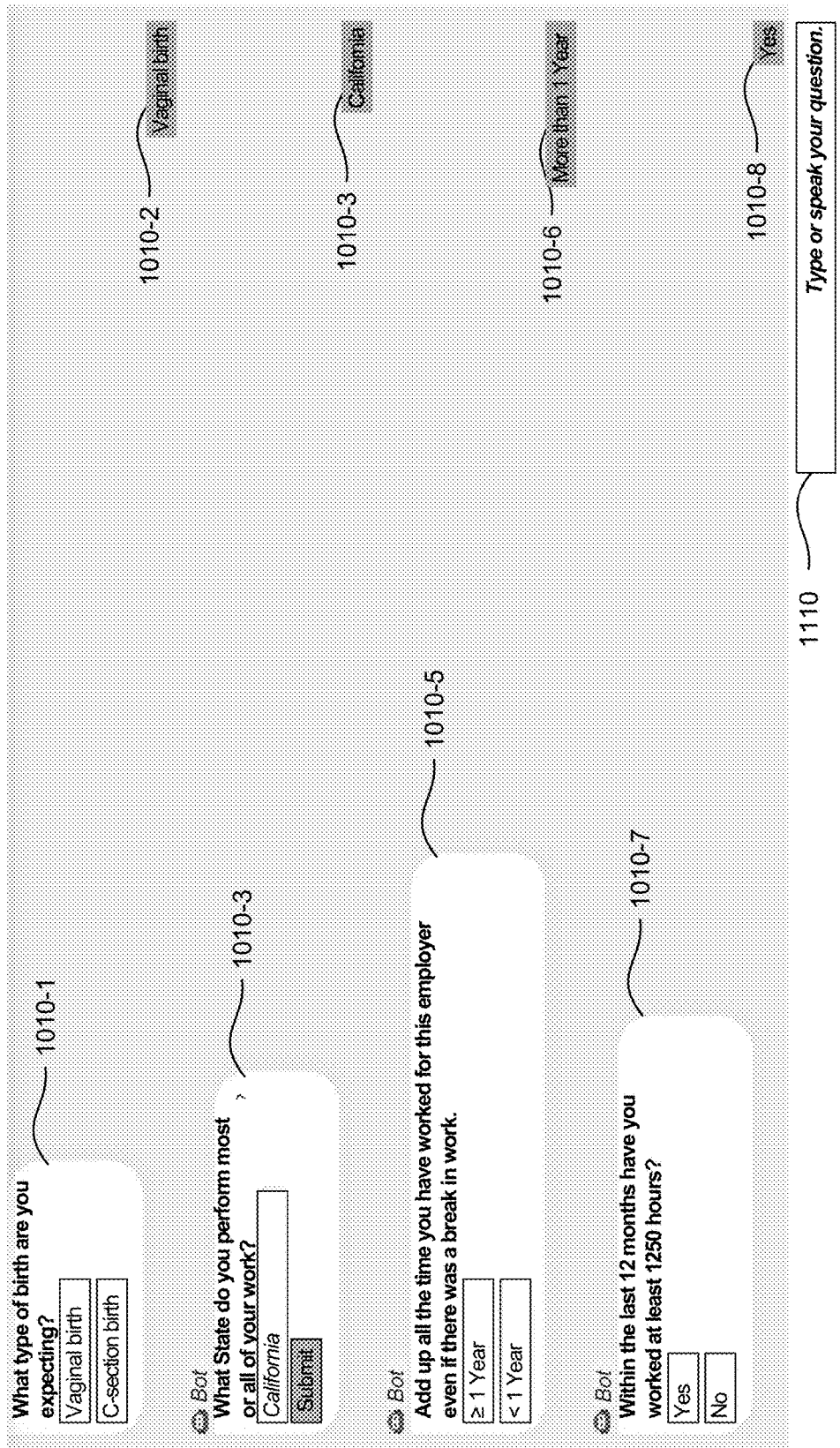
FIG. 17 illustrates a user interface of a display of a client device that allows a user to engage with a text-based conversation with an automated human interface module through a respective communication channel hosted by a communications platform module.

Blocks 626-628. Referring to blocks 626 and 628, in some embodiments, the change of the at least the output dependency includes configuring a visualization of the compliance information presented to the user through a node graph (e.g., first node graph 334-1 of FIG. 3B). For instance, referring to FIG. 16A through 16C illustrate example user interfaces for absentee reports in accordance with some embodiments of the present disclosure. FIG. 16A shows a user interface 902 corresponding to a create custom report search 904. The user interface 902 includes an option 906 to create a custom report. FIG. 16B shows a user interface 910 for creating a custom report. The user interface 910 includes various fields and options for generating a custom report, including a report name field 912, a report type 914, and a data source 916. In some embodiments, the user generating the custom report is able to select various parameters for the report (e.g., temporary or permanent) as well as data sources for the report. FIG. 16C shows a user interface 920 for editing a custom report, including options to edit the report name, tags, and data sources. The user interface includes a columns tab for editing the report columns as shown in FIG. 16C. In some embodiments, the user interface 930 for editing a custom report that includes a prompts tab 932. The user interface 930 includes options for editing prompt instructions, prompt dates, fields, and defaults. In some embodiments, user interface 940 for editing a custom report that includes a share tab 942. The share tab 942 includes a plurality of sharing options for sharing the report with other users and/or groups.

In some embodiments, the visualization of the compliance information includes one or more charts, one or more graphs, one or more maps, one or more calendars, one or more text boxes, or a combination thereof, which provide a graphical aid for allowing an end-user to interpret compliance information communicated by the compliance computer system 200, such as updated compliance information and/or a progression of the end-user through a respective node graph 334. For instance, in some embodiments, the one or more charts, one or more graphs, one or more maps, one or more calendars, or a combination thereof include one or more bars, one or more lines, one or more axes, one or more data plots, or a combination thereof. In some embodiments, the one or more maps includes one or more regions, one or more symbols, one or more colors, or more hatchings, one or more stippling, or a combination thereof to represent characteristics associated with an underlying data structure. However, the present disclosure is not limited thereto.

Block 630. Referring to block 630, in some embodiments, the method 600 includes determining when the change of the at least the output dependency or the input dependency of the corresponding conditional logic associated with the first workforce status tool 348-1 satisfies one or more compliance requirements 326 associated with a corresponding benefit 322 associated with the first institution. In some embodiments, the compliance computer system 200 determines when the change responsive to the request to configure the first workforce status tool 348-1 satisfies the one or more compliance requirements 326 associated responsive to receiving the request to configure the workforce status tool 348-1 (e.g., responsive to block 610 of FIG. 6A).

In some embodiments, the one or more compliance requirements 326 includes between one and 50 compliance requirements 326, between two and 30 compliance requirements 326, between 3 and 24 compliance requirements 326, between 5 and 15 compliance requirements 326, or between 7 and 10 compliance requirements 326. In some embodiments, the one or more compliance requirements 326 includes at least one compliance requirement 326, at least two compliance requirements, at least 4 compliance requirements, at least 5 compliance requirements, at least 10 compliance requirements, at least 12 compliance requirements, at least 15 compliance requirements, at least 22 compliance requirements, or at least 50 compliance requirements. In some embodiments, the one or more compliance requirements 326 includes at most one compliance requirement 326, at most two compliance requirements, at most 4 compliance requirements, at most 5 compliance requirements, at most 10 compliance requirements, at most 12 compliance requirements, at most 15 compliance requirements, at most 22 compliance requirements, or at most 50 compliance requirements.

Block 632. Referring to block 632 of FIG. 6C, in some embodiments, the determining when the change of the at least the output dependency or the input dependency of the corresponding conditional logic satisfies the one or more compliance requirements 326 further includes authenticating the request to configure the first workforce status tool in accordance with a login operation protocol. For instance, in some embodiments, the request 212 to configure the first workforce status tool 348-1 is authenticated (e.g., by the compliance computer system 200, by a database, etc.) prior to the compliance computer system 200 requesting determining when a change associated with the request is satisfied (e.g., block 630 of FIG. 6B), updating a node graph 334 (e.g., block 640 of FIG. 6C), or communicating a response to the request 212 (e.g., block 634 of FIG. 6C, block 644 of FIG. 6D, etc.). In some embodiments, the request is authenticated via the login operation protocol using a password and/or passcode associated with the first employee, such as a unique identifier associated with a respective subject. In some embodiments, the unique identifier associated with the respective subject includes a unique numeric or alphanumeric sequence that is assigned by the institution to the respective subject when employed by the institution. In some embodiments, the unique identifier includes certified identification, such as a social security number associated with the respective subject, an immigration visa number associated with the respective subject, a driver's license number associated with the respective subject, or the like. In some embodiments, the unique identifier includes biometric data, such as a voiceprint, a fingerprint, a retinal print, or a combination thereof that is associated with the respective subject. However, the present disclosure is not limited thereto.

In some embodiments, the login operation protocol includes determining one or more permissions for the first employee. For instance, in some embodiments, the login operation protocol includes determining whether the first employee has permission to view the first workforce status tool 348-1, to write changes to the first workforce status tool 348-1, or the like. As a non-limiting example, in some embodiments, the first employee has read and write permissions associated with the first workforce status tool 348-1 and read privileges associated with a second workforce status tool 348-2, whereas a second employee different than the first employee has reading privileges associated with the first workforce status tool 348-1 and no privileges associates with the second workforce status tool 348-2. However, the present disclosure is not limited thereto.

Block 634. Referring to block 634, in some embodiments, the method 600 includes updating a node graph (e.g., node graph 334 of FIG. 3B). In some embodiments, the node graph 334 is updated by the compliance computer system 200 in accordance with a determination the change of the at least the output dependency or the input dependency of the corresponding conditional logic satisfies the one or more compliance requirements 326. In some embodiments, the node graph 334 is a binary node graph, such that each node 336 has a degree of two (e.g., at most two child nodes 336). However, the present disclosure is not limited thereto. For instance, in some embodiments, the node graph 334 has a binary tree structure for each node 336 in a first subset of nodes 336, for instance, except each node 336 in a second subset of nodes 336.

The node graph 334 includes a plurality of interconnected nodes (e.g., nodes 336 of FIG. 3B). In some embodiments, each respective node 336 in the plurality of interconnected nodes 336 of the node graph 334 is connected to at least one other node 336 in the plurality of interconnected nodes 336, such as a first edge that connects a first node 336-1 to a fifth node 336-5 and/or a second edge that connects the first node 336-1 to a sixth node 336-6, which bypasses the fifth node 336-5. However, the present disclosure is not limited thereto.

In some embodiments, the plurality of interconnected nodes 336 includes 5 or more nodes, 10 or more nodes, 100 or more nodes, 150 ore more nodes, 500 or more nodes, 1,000 or more nodes, 5,000 or more nodes, 7,500 or more nodes, 15,000 or more nodes, 60,000 or more nodes, or 100,000 or more nodes. Accordingly, given the scale of the plurality of interconnected nodes 366, the methods 600 of the present disclosure cannot be mentally performed, and, therefore, require utilizing the compliance computer system 200. This is particularly the case when the number of conversations that are concurrently hosted is considered.

At least one node 336 in the plurality of interconnected nodes 336 is associated with the conditional logic for the corresponding workforce status category in the enumerated plurality of workforce status categories. In some embodiments, each respective node 336 in at least a first subset of the plurality of nodes 336, as referred herein as a "first subset of nodes 336" is associated with at least one compliance requirement 326. For instance, in some embodiments, a respective compliance requirement 326 includes a predetermined compliance question (e.g., first node 336-1 is associated with first compliance requirement including a first compliance question 326-1, second node 336-2 is associated with second compliance requirement 326-2 including a second compliance question and third compliance requirement 326-3 including a third compliance question, etc.). In some embodiments, each predetermined compliance question associated with a respective compliance requirement 326 includes a prompt to a subject that is configured to obtain information from the subject. For instance, in some embodiments, a first predetermined compliance question associated with a first compliance requirement 326-1 is configured to determine if the subject satisfies a requirement for eligibility for a corresponding benefit 322.

As a non-limiting example, consider a first workforce status category 338-1 associated with excused absences for administrative leave. Such excused absences include time off from work for a subject without charge to leave or loss of pay. In some embodiments, each respective node 336 in at least a second subset of the plurality of nodes 336 of the node graph 334 is associated with a respective workforce status category 338 in an enumerated plurality of workforce status categories 338. The respective workforce status category 338 includes a corresponding plurality of requirements 326 for compliance with the respective workforce status category 338. Accordingly, utilizing the same non-limiting example, a first requirement 326-1 of the first workforce status category 338-1 has a first conditional logical that the subject be absent from work for a reason from a predetermined list of reasons including voting, voter registration, employment-replayed conference attendance, blood donation services, visits to human resources services, visits to equal employment opportunity services, union representation attendance, medical services related to on the job-related injuries and/or illness, employment related surveillance program attendance, or a combination thereof. From this first requirement 326-1, a first node 336-1 is associated with a first predetermined compliance question that is configured to elicit a response from the subject in order to determine if the subject has the condition that the subject be absent from work for the reason from the predetermined list of reasons. Moreover, in some embodiments, the first workforce status category 338-1 includes a second requirement 326-2 that requires that the subject is allowed to utilized up to seven days of paid leave per calendar year to serve as a bone marrow donor, a third requirement 326-3 that the subject is allowed to utilized up 30 days to be an organ donor in addition to sick leave or annual leave, a fourth requirement 326-4 that when the subject has fewer than 80 hours of accrued sick leave that the subject is granted up to 4 hours for preventative health care, a fifth requirement 326-5 that the excused absence or administrative leave is not granted when the subject is currenting conducting a disciplinary action with the institution, or a combination thereof. Accordingly, in some embodiments, the second node 336-2 is associated with a second compliance requirement 326-2 that is configured to elicit a response from the subject in order to determine if the subject is planning to be absent from work in order to serve as a bone marrow donor. One of skill in the art will appreciated that the present disclosure is not limited thereto.

In some embodiments, a respective requirement 326 is associated with a characteristic of the respective institution that employs the respective subject. For instance, the federal FMLA regulation is only application to institutions that have at least fifty employees, who have been employed by that institution for at least twelve months, and who have worked for that institution for at least 1,250 hours in the past year.

For the purposes of the present disclosure, the systems and methods are described in the context of a benefits 322 that is utilized to manage time off work for a respective subject, such as sick leave, maternity leave, military leave, or the like. However, one of skill in the art will appreciate that the systems and methods of the present disclosure are applicable to a wide variety of industry where employee resources need to be managed, such as one or more transportation industries (e.g., airline industry and/or trucking industry, etc.), one or more government institutions or service industries (e.g., teachers, nurses, etc.), one or more technology industries (e.g., a life sciences research and development industry, a software-as-a-service industry, etc.), one or more healthcare industries, one or more manufacturing industries, or the like. As such, the systems and methods of the present disclosure are capable of providing individualized, subject-specific evaluations for a subject employed by an entity working in a complex, regulated industry.

Blocks 636-638. Referring to blocks 636 and 638, in some embodiments, the updating of the node graph 334 further includes storing the change of the at least the output dependency or the input dependency of the corresponding conditional logic. For instance, in some embodiments, this storing is performed by the compliance computer system 200, which stores the change of the at least the output dependency or the input dependency of the corresponding conditional logic within a corresponding data structure of the first workforce status tool 348-1. However, the present disclosure is not limited thereto, for instance, in some embodiments, the updating of the node graph 334 further includes generating a corresponding data structure of a second workforce status tool 348-2. In some such embodiments, the second workforce status tool 348-2 is configured to implement the change of the at least the output dependency or the input dependency of the corresponding conditional logic of the first workforce status tool 348-1, such as without overwriting a native conditional logic of the first workforce status tool 348-2.

Block 622. Referring to block 622, in some embodiments, the change of the at least the output dependency or the input dependency of the corresponding conditional logic includes a correlation between a first node 336-1 and the at least one node 336 in the plurality of interconnected nodes 336 is associated with the conditional logic for the corresponding workforce status category. For instance, in some embodiments, the correlation of the change includes changing one or edges associated with a respective node 336, such by changing a first edge that connects the first node 336-1 to a fifth node 336-5 instead of a fourth node 336-4 and a sixth node 336-6. However, the present disclosure is not limited thereto.

Block 640. Referring to block 640, in some embodiments, the method 600 further includes presenting updated compliance information to a user, such as a second employee of the first institution. In some embodiments, the user is a third employee of a second institution different than the first institution, which allows for the updated compliance information to be utilized across a variety of institutions. However, the present disclosure is not limited thereto. In some embodiments, the presenting updated compliance information to the user using the node graph 334 in order to obtain the updated compliance information for presentation. For instance, in some such embodiments, responsive to the change of the at least the output dependency or the input dependency of the corresponding conditional logic and in accordance with a corresponding progression of the user through the plurality of interconnected nodes 336 of the node graph, compliance information is presented to the user through a user interface 376 displayed on a display 378 of a client device 300 based at least in part on a current node position associated with the user and/or using a response or request associated with the user to advance the user to another node 336 in the node graph 334.

Block 642. Referring to block 642, in some embodiments, the presenting the updated compliance information includes utilizing a protocol, such as a communication protocol associated with a communication network (e.g., communication network 106 of FIG. 1) to present updated compliance information to the user. In some such embodiments, the protocol is selected from the group consisting of: a voice over Internet Protocol (VoIP), an Internet message access protocol (IMAP), a post office protocol (POP), an extensible messaging and presence protocol (XMPP), a Session Initiation Protocol for Instant Messaging and Presence Leveraging Extensions (SIMPLE), an Instant Messaging and Presence Service (IMPS), and Short Message Service (SMS) protocol.

Block 644. Referring to block 644 of FIG. 6D, in some embodiments, the method 600 further includes hosting, via a communication network (e.g., communication network 106 of FIG. 1, communication network 106 of FIG. 2, communication network 106 of FIG. 3A, communication network 106 of FIG. 4, communication network 106 of FIG. 5A, etc.), a communication platform module (e.g., client application 406 of FIG. 4, communications platform module 328 of FIG. 3B, etc.). In some such embodiments, the communication platform module 328 is configured to be accessible by the user through a graphical user interface 376 displayed through a display 378 of a client device 300, such as through a client application 406. In some embodiments, the client device 300 is remote from the compliance computer system 200. However, the present disclosure is not limited thereto.

In some embodiments, this communication channel 330 is in a plurality of communication channels 330. In some embodiments there is only one communication channel 330. In some embodiments, the plurality of communication channels 330 includes 10 or more communication channels, 50 or more communication channels, 100 or more communication channels, 250 or more communication channels, 2,000 or more communication channels, 5,000 or more communication channels, 10,000 or more communication channels, or 100,000 or more communication channels. However, as noted above, in some embodiments there is only a single communication channel 330 hosting multiple conversations concurrently. In still other embodiments each of a plurality of communication channels 330 hosts a different plurality of conversations. In still other embodiments, each respective communication channel 330 in a plurality of communication channels 330 host a single corresponding conversation. Regardless of the architecture, in some embodiments, 4 or more, 6 or more, 8 or more, 10 or more, 20 or more, 30 or more, 40 or more, between 5 and 1000, 100 or more, or 1000 or more conversations are concurrently supported in some embodiments of the present disclosure.

In some embodiments, the conversation includes a text-based conversation 330.

However, the present disclosure is not limited thereto. For instance, in some embodiments, the conversation includes a text-based conversation, a voice-based conversation (e.g., via a VOIP protocol), a video-based conversation, or a combination thereof. Accordingly, in some such embodiments, the communications platform module 328 allows the method 600 to engage with a user within a communication channel 330 independent of a mode of communication between the user and an automated human interface module 332 associated with the communication channel. Moreover, in some such embodiments, the communication channel 330 allows for sending and/or receiving communications in more than one more, such as a first text-based mode and a second voiced-based mode. However, the present disclosure is not limited thereto.

In some embodiments, to trigger initialization of a respective communication channel 330 hosted by an automated human interface module 322, the automated human interface module 322 presents the respective subject with an initial message (e.g., first message 1010-1 of FIG. 17) and one or more options for responses to select from that are accurately relevant to a task the respective subject is interested in, such as determining eligibility for a respective benefit 322 in a plurality of benefits 322 (e.g., second benefit 322 of FIG. 3A). For instance, in some embodiments, the automated human interface module 322 presents the respective subject with the initial message (e.g., an initial predetermined compliance question associate with a compliance requirement 326), such as a first message 1010-1 that states, "To get started, please select which situation you are in." In some embodiments, the automated human interface module 322 presents through the first message 1010-1 the respective subject with one or more options for responses to the initial message (e.g., a first option "Adding to my family," a second option "Dealing with an illness/injury," etc.). For instance, in some such embodiments, each option in the one or more options for response to the initial message is a corresponding output dependency of a corresponding conditional logic associated with a workforce status tool 348. However, the present disclosure is not limited thereto. For instance, referring briefly to FIG. 71, in some embodiments, the respective subject is provided with a mechanism 1100 (e.g., radio button mechanism, text entry mechanism, voice capture mechanism, etc.) that allows the respective subject to input (e.g., via input 380 of client device 300) a request 212 to the automated human interface module 332. Accordingly, in some such embodiments, the method 600 processes a message, such as by using a speech-to-text model 310, such that the automated human interface module 310 provides a responsive message 1010 to the first message 1010-1 formed from the one or more utterances captured from the respective subject in accordance with a change of the at least one output dependency or the input dependency of the corresponding conditional logic. Accordingly, in some embodiments, the responsive message is generated by the automated human interface module 322 based on available conditional logic, such as by providing a message 1010 including a corresponding predetermined compliance question associated with a corresponding compliance requirement of an initial node 366, in which the initial node 366 is selected based on the first message 1010-1 (e.g., based on an input dependency defined by the first message 1010-1). However, the present disclosure is not limited there.

In some embodiments, the respective communication channel 330 supports a two-way, duplex, conversation, for example, a business to consumer (B2C) conversation between the respective subject (e.g., the consumer or employee) and the automated human interface module 322, which acts as an agent for the business. In some embodiments, the respective communication channel 330 is configured for web-based chat, such as a mobile chat, which replaces electronic mail. Accordingly, in some such embodiments, this mobile chat takes the form of a conversation within the respective communication channel 330, such as a text-based conversation. However, the present disclosure is not limited thereto.

In some embodiments, the automated human interface module 332 includes an audio and voice response module, which allows for the automated human interface module 332 to engage with the respective subject within a communication channel 330 using utterance-base conversations (e.g., talking) in order to present compliance information to the respective subject. For instance, in some embodiments, a respective message includes audio data, such as a voice recording (e.g., received through communication network 106 via client device 300, received through a microphone input 380 of FIG. 4, etc.), an audio portion of a video file, and the like. In some embodiments, a voice associated with the automated human interaction module 332 within the conversation is provided by a subject of the respective entity that employs the respective subject, such as a CEO of the respective entity. However, the present disclosure is not limited thereto.

In some embodiments, the request includes a respective first application programming interface ("API") token, which is at least utilized to uniquely identify the respective text-based conversation or the respective subject, such as by identifying the respective communication channel 330 within the plurality of communication channels 330 or the electronic address 404 of a client device 300 associated with the subject. In some embodiments, the API token is uniquely associated with a subject. In some embodiments, the API token is uniquely associated with a conversation, which allows the subject to carry on the conversation within a different communication channel 330 or using a different mode of communication within the communication channel 330. In some embodiments, the API token allows multiple conversations with multiple recipients to be hosted by a common communication channel 330. That is, although multiples messages may exist on the communication channel 330, each message is flagged by a token indicating which subject, or which conversation, the message is associated with, such as by monitoring a plurality of threads within the communication channel 330

In some embodiments, a client application of the respective client device (e.g., client application 406 of client device 300 of FIG. 4) invokes an API call via a data access protocol (e.g., block 612 of FIG. 6A) and/or a login optional protocol (e.g., block 632 of FIG. 6C) within the conversation. In some embodiments, in response to this API call, a communications platform module (e.g., communications platform module 328 of FIG. 3B) receives the API call and makes another API call to a back-end system associated with the compliance computer system 200, such as a remote computer system administrated by an institution of the respective subject, and receives a query result of the API call. In some embodiments, the query result is translated from a first format into a second format by the communications platform module 328, which is then returned to the client device 300 for display within the communication channel 330, such as in the form of updated compliance information. However, the present disclosure is not limited thereto.

Accordingly, in some such embodiments, the method 600 allows the computer compliance system 200 and/or the client device 300 to be configured with an API to integrate with, such as direct integration and/or database integration) with other external services (e.g., one or more enterprise resource databases, etc.).

Moreover, in this way, in some such embodiments, the method 600 is personalized to the user since the method 600 is capable of obtaining information associated with the respective user, either directly from the respective user (e.g., via message 1010) or indirectly (e.g., by retrieval from a remote database), which is utilized to determine if the respective subject satisfies one or more requirements 326 associated with a corresponding benefit 322 and presenting updated compliance information based on the eligibility of the respective subject for the corresponding benefit 322.

Block 646. Referring to block 646, in some embodiments, the communication network includes 106 a local area communication network (LAN), a wide area communication network (WAN), a cellular communication network, an intranet communication network, a wireless communication network, a metropolitan area network (MAN), or a combination thereof.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that includes a computer program mechanism embedded in a non-transitory computer-readable storage medium. For instance, the computer program product could contain instructions for operating the user interfaces disclosed herein and described with respect to the Figures. These program modules can be stored on a CD-ROM, DVD, magnetic disk storage product, USB key, or any other non-transitory computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed is:

1. A method, comprising:
at a server system comprising one or more processors and memory:
storing, in electronic form, one or more workforce status tools, wherein each workforce status tool in the one or more workforce status tools is configured to implement a conditional logic for a corresponding workforce status category in an enumerated plurality of workforce status categories for a respective employee at a first institution;
receiving a request to configure a first workforce status tool in the one or more workforce status tools in the enumerated plurality of workforce statuses, wherein the request is associated with a first employee of the first institution, and wherein the request to configure the first workforce status tool comprises a change of at least an output dependency or an input dependency of a corresponding conditional logic associated with the first workforce status tool;
determining, responsive to the request to configure the first workforce status tool, when the change of the at least the output dependency or the input dependency of the corresponding conditional logic associated with the first workforce status tool satisfies one or more compliance requirements associated with a corresponding benefit associated with the first institution;
updating, in accordance with a determination the change of the at least the output dependency or the input dependency of the corresponding conditional logic satisfies the one or more compliance requirements, a node graph comprising a plurality of interconnected nodes, wherein at least one node in the plurality of interconnected nodes is associated with the conditional logic for the corresponding workforce status category in the enumerated plurality of workforce status categories; and
presenting updated compliance information to a user, using the node graph, responsive to the change of the at least the output dependency or the input dependency of the corresponding conditional logic and in accordance with a corresponding progression of the user through the plurality of interconnected nodes.

2. The method of claim 1, wherein the method further comprises:
hosting, via a communication network, a client application accessible by the user through a graphical user interface displayed through a display of a client device.

3. The method of claim 2, wherein the communication network comprises a local area communication network (LAN), a wide area communication network (WAN), a cellular communication network, an intranet communication network, a wireless communication network, a metropolitan area network (MAN), or a combination thereof.

4. The method of claim 1, wherein the one or more workforce status tools comprises an account services tool, a digital security tool, a physical security tool, a facility security tool, an intake tool, a leave status tool, a reporting tool, an administrative tool, a benefits tool, a stock purchase plan tool, a performance review tool, a workload management tool, a demographic tool, a notification tool, a task management tool, a billing tool, a support tool, a training tool, a correspondence tool, a compliance tool, a utility tool, a feedback tool, a medical outreach tool, or a combination thereof.

5. The method of claim 1, wherein the first workforce status tool is further configured to implement a data access protocol associated with obtaining personal identifiable information of the user.

6. The method of claim 1, wherein the enumerated plurality of workforce status categories comprises a performance workforce status category, a maternity leave workforce status category, a short-term disability workforce status category, a longer-term disability workforce status category, a sick leave workforce status category, a fostering or adopting workforce status category, an employer program workforce status category, a surrogacy workforce status category, a parental workforce status category, a pre-natal leave workforce status category, a newborn baby bonding leave workforce status category, a caregiver leave workforce status category, a military service leave workforce status category, a paid time off (PTO) leave workforce status category, a vacation workforce status category, or a combination thereof.

7. The method of claim 1, wherein the first employee is an administrator of the first institution, and wherein the user is an employee of the first institution different than the administrator.

8. The method of claim 1, wherein the first institution is a federal government institution, a state government institution, a county government institution, a municipal government institution, a private institution, a for-profit institution, a non-profit institution, an insurance institution, or a combination thereof.

9. The method of claim 1, wherein the request to configure the first workforce status tool is provided, at least in part, from selecting a first menu item by the administrator, selecting a first button by the administrator, providing an input in a text box by the administrator, selecting a check box by the administrator, selecting a first row and/or a first column in a first table by the administrator, performing a custom action by the administrator, moving a position of a slider by the administrator, or a combination thereof.

10. The method of claim 1, wherein the corresponding conditional logic comprises Boolean logic.

11. The method of claim 1, wherein the change of the at least the output dependency or the input dependency of the corresponding conditional logic comprises a correlation between a first node and the at least one node in the plurality of interconnected nodes is associated with the conditional logic for the corresponding workforce status category.

12. The method of claim 1, wherein the change of the at least the output dependency comprises defining at least a total number of days a respective user is entitled to be absent from the first institution within a period of time.

13. The method of claim 1, wherein the change of the at least the output dependency comprises configuring a visualization of the compliance information presented to the user through the node graph.

14. The method of claim 13, wherein the visualization of the compliance information comprises one or more charts, one or more graphs, one or more maps, one or more calendars, one or more text boxes, or a combination thereof.

15. The method of claim 1, wherein the determining when the change of the at least the output dependency or the input dependency of the corresponding conditional logic satisfies the one or more compliance requirements further comprises authenticating the request to configure the first workforce status in accordance with a login operation protocol.

16. The method of claim 1, wherein the updating the node graph further comprises storing, in electronic form, within a corresponding data structure of the first workforce status tool, the change of the at least the output dependency or the input dependency of the corresponding conditional logic.

17. The method of claim 1, wherein the updating the node graph further comprises generating, in electronic form, a corresponding data structure of a second workforce status tool, wherein the second workforce status tool is configured to implement the change of the at least the output dependency or the input dependency of the corresponding conditional logic of the first workforce status tool.

18. The method of claim 1, wherein, the presenting comprises utilizing a protocol to present updated compliance information to the user, wherein the protocol is selected from the group consisting of: a voice over Internet Protocol (VoIP), an Internet message access protocol (IMAP), a post office protocol (POP), an extensible messaging and presence protocol (XMPP), a Session Initiation Protocol for Instant Messaging and Presence Leveraging Extensions (SIMPLE), an Instant Messaging and Presence Service (IMPS), and Short Message Service (SMS) protocol.

19. A computer system, the computer system comprising one or more processors, a controller, wherein at least one program is non-transiently stored in the controller and executable by the controller, the at least one program causing the controller to perform a method comprising:
  storing, in electronic form, one or more workforce status tools, wherein each workforce status tool in the one or more workforce status tools is configured to implement a conditional logic for a corresponding workforce status category in an enumerated plurality of workforce status categories for a respective employee at a first institution;
  receiving a request to configure a first workforce status tool in the one or more workforce status tools in the enumerated plurality of workforce statuses, wherein the request is associated with a first employee of the first institution, and wherein the request to configure the first workforce status tool comprises a change of at least an output dependency or an input dependency of a corresponding conditional logic associated with the first workforce status tool;
  determining, responsive to the request to configure the first workforce status tool, when the change of the at least the output dependency or the input dependency of the corresponding conditional logic associated with the first workforce status tool satisfies one or more compliance requirements associated with a corresponding benefit associated with the first institution;
  updating, in accordance with a determination the change of the at least the output dependency or the input dependency of the corresponding conditional logic satisfies the one or more compliance requirements, a node graph comprising a plurality of interconnected nodes, wherein at least one node in the plurality of interconnected nodes is associated with the conditional logic for the corresponding workforce status category in the enumerated plurality of workforce status categories; and
  presenting updated compliance information to a user, using the node graph, responsive to the change of the at least the output dependency or the input dependency of the corresponding conditional logic and in accordance with a corresponding progression of the user through the plurality of interconnected nodes.

20. A non-transitory computer readable storage medium storing one or more programs, the one or more programs comprising instructions, which when executed by a computer system, cause the computer system to perform a method comprising:
  storing, in electronic form, one or more workforce status tools, wherein each workforce status tool in the one or more workforce status tools is configured to implement a conditional logic for a corresponding workforce status category in an enumerated plurality of workforce status categories for a respective employee at a first institution;
  receiving a request to configure a first workforce status tool in the one or more workforce status tools in the enumerated plurality of workforce statuses, wherein the request is associated with a first employee of the first institution, and wherein the request to configure the first workforce status tool comprises a change of at least an output dependency or an input dependency of a corresponding conditional logic associated with the first workforce status tool;
  determining, responsive to the request to configure the first workforce status tool, when the change of the at least the output dependency or the input dependency of the corresponding conditional logic associated with the first workforce status tool satisfies one or more compliance requirements associated with a corresponding benefit associated with the first institution;

updating, in accordance with a determination the change of the at least the output dependency or the input dependency of the corresponding conditional logic satisfies the one or more compliance requirements, a node graph comprising a plurality of interconnected nodes, wherein at least one node in the plurality of interconnected nodes is associated with the conditional logic for the corresponding workforce status category in the enumerated plurality of workforce status categories; and presenting updated compliance information to a user, using the node graph, responsive to the change of the at least the output dependency or the input dependency of the corresponding conditional logic and in accordance with a corresponding progression of the user through the plurality of interconnected nodes.

\* \* \* \* \*